(12) United States Patent
Loeffler et al.

(10) Patent No.: US 9,741,316 B2
(45) Date of Patent: Aug. 22, 2017

(54) METHOD AND SYSTEM FOR DISPLAYING PIXELS ON DISPLAY DEVICES

(71) Applicant: UNIVERSITAET DES SAARLANDES, Saarbrücken (DE)

(72) Inventors: Alexander Loeffler, Saarbrücken (DE); Luciano Pica, Speyer (DE); Jochen Miroll, Saarbrücken (DE); Thorsten Herfet, Schwarzenbeck (DE); Philipp Slusallek, Bexbach (DE)

(73) Assignee: Universität des Saarlandes, Saarbrücken (DE)

( * ) Notice: Subject to any disclaimer, the term of this patent is extended or adjusted under 35 U.S.C. 154(b) by 134 days.

(21) Appl. No.: 14/410,038

(22) PCT Filed: Jun. 24, 2013

(86) PCT No.: PCT/EP2013/063167
§ 371 (c)(1),
(2) Date: Dec. 19, 2014

(87) PCT Pub. No.: WO2013/190146
PCT Pub. Date: Dec. 27, 2013

(65) Prior Publication Data
US 2015/0187333 A1 Jul. 2, 2015

(30) Foreign Application Priority Data
Jun. 22, 2012 (EP) .................................... 12173206

(51) Int. Cl.
*G09G 5/00* (2006.01)
*G09G 5/12* (2006.01)
(Continued)

(52) U.S. Cl.
CPC ............. *G09G 5/12* (2013.01); *G06F 3/1438* (2013.01); *G06F 3/1446* (2013.01); *G09G 5/008* (2013.01);
(Continued)

(58) Field of Classification Search
CPC ....................................................... G09G 5/12
See application file for complete search history.

(56) References Cited

U.S. PATENT DOCUMENTS 5,523,769 A 6/1996 Lauer et al.
5,963,200 A * 10/1999 Deering ................ G06F 3/1446
345/1.2

(Continued)

FOREIGN PATENT DOCUMENTS

JP 2002369163 12/2002

OTHER PUBLICATIONS

De Almeida R.A. et al,: "Looking Behind Bezels: French Windows for Wall Displays," AVI 12 Proceedings of the International Working Conference on Advanced Visual Interfaces May 26, 2012, pp. 124-131, XP055186754.

(Continued)

*Primary Examiner* — Jason Olson
(74) *Attorney, Agent, or Firm* — Siritzky Law, PLLC

(57) ABSTRACT

A method for displaying pixels on display devices, comprising the steps of (a) Providing virtual pixel storage means, preferably one or more virtual frame buffers (6), for temporarily storing the pixel data, (b) Receiving pixel data into the virtual pixel storage means (6) from one or more pixel sources (5), (c) Processing the pixel data stored in the virtual pixel storage means, based on characteristic display parameters characterizing the display devices; and (d) Transmitting the pixel data from the virtual pixel storage means (6) to one or more virtual displays attached to the virtual pixel
(Continued)

storage means via a network (7), based on a network transmission protocol. The invention further relates to a system for displaying pixels on display devices.

20 Claims, 11 Drawing Sheets

(51) Int. Cl.
  *G06F 3/14* (2006.01)
  *G09G 5/04* (2006.01)
(52) U.S. Cl.
  CPC ......... *G09G 5/04* (2013.01); *G09G 2300/026* (2013.01); *G09G 2352/00* (2013.01); *G09G 2360/04* (2013.01); *G09G 2370/025* (2013.01); *G09G 2370/10* (2013.01); *G09G 2370/22* (2013.01)

(56) References Cited

U.S. PATENT DOCUMENTS

| | | | |
|---|---|---|---|
| 9,549,011 B2* | 1/2017 | Wogsberg | H04N 7/181 |
| 2005/0174482 A1 | 8/2005 | Yamada et al. | |
| 2008/0211825 A1 | 9/2008 | Sunakawa et al. | |
| 2009/0089453 A1* | 4/2009 | Bohan | G06F 3/14 709/246 |
| 2010/0156854 A1 | 6/2010 | Fisher et al. | |
| 2012/0050613 A1 | 3/2012 | Halna Du Fretay et al. | |

OTHER PUBLICATIONS

Didas, Stephan, "Synchronization in the Network-Integrated Multimedia Middleware (NMM)," Universität des Saarlandes, Saarbrücken, 2002, Mar. 14, 2014.
Leeman, Marc. "Displaying synchronized video," Gstreamer Conference 2011, Oct. 25, 2011, [slides downloaded from https://gstconf.ubicast.tv/videos/displaying-sychronized-video-2/ on Dec. 29, 2015], Mar. 14, 2014.
Liu, Yong, "Principle and Practice of Distributing Low and High Resolution Display Content from One Computer to Many Computers in Stand-alone or Display Wall Configurations," Dissertation for the Degree of Philosophiae Doctor, Dec. 2010, University of Tromso, Mar. 14, 2014, downloaded from http://munin.uit.no/bitstream/handle/10037/2959/thesis.pdf on Dec. 29, 2015.
Löffler, Alexander, et al,, "Multi-Display-Wande als skalierbare, immersive Stereo-Anzeigesysteme," (Multi-display walls as a scalable, immersive stereo display systems), 9. Fachtagung Digitales Engineering Zum Planen, Testen Und Betreiben Technischer Systeme, Jun. 2012.
Löffler, Alexander, et al,, "Networked Displays for VR Applications: Display as a Service (DaaS)," in Virtual Environments 2012: Proceedings of Joint Virtual Reality Conference of ICAT-EGVE-EuroVR (JVRC-2012), Oct. 17, 2012-Oct. 19, 2012, Madrid, Spain, pp. 37-44.
Lohse, Marco, "Network-Integrated Multimedia Middleware, Services, and Applications," Dissertation Zur Erlangung Des Grades Des Doktors Der Ingenieurwissenschaften Der Naturwissenschaftlich, 2005, Mar. 14, 2014 [download from http://marcolohse.org/publications/phd/marco_lohse-nmm-phd-2005.pdf on Dec. 29, 2015].
Metzger, Julian, "Active-Stereo Synchronization of multiple Displays via Ethernet," Jan. 2, 2012, Master Thesis, Saarland University. [Downloaded from http://www.nt.uni-saarland.de/fileadmin/file_uploads/theses/master/master_thesis_jm.pdf on Dec. 29, 2015], Mar. 14, 2014.
Miroll, Jochen, et al,, "Reverse genlock for synchronous tiled display walls with Smart Internet Displays," Berlin (ICCE-Berlin),
2012 IEEE International Conference on Consumer Electronics, Sep. 3-5, 2012, pp. 236-240, Mar. 14, 2014.
Repplinger, Michael, et al: "A Flexible Adaptation Service for Distributed Rendering," Eurographics Symposium on Parallel Graphics and Visualization, Jan. 1, 2009, XP055186660 DOI: 10.2312/EGPGV/EGPGV09/049-0564.
Sand, Markus, "Design and Implementation of a System for Recording and Playback of Presentations," Universität des Saarlandes, Saarbrücken, 2003, Mar. 14, 2014 [download from http://www.marcolohse.org/teaching/thesis/msand2003.pdf on Dec. 29, 2015].
Tamm Georg et al, "ZAPP: A Management Framework for Distributed Visualization Systems," International Conference on Computer Graphics, Visualization, Computer Vision and Image Processing 2011, Jul. 24, 2011-Jul. 26, 2011, Rome, Italy.
Third Party Observation #1 filed by Anonymous in PCT/EP2013/063155, Mar. 14, 2014 [4 pgs.].
Third Party Observation #2 filed by Anonymous in PCT/EP2013/063155, Mar. 14, 2014 [4 pgs.].
Third Party Observation #3 filed by Anonymous in PCT/EP2013/063155, Mar. 14, 2014 [3 pgs.].
WIPO, International Preliminary Report on Patentability, PCT/EP2013/063155, mailed Dec. 23, 2014 [6 pgs.].
WIPO, International Search Report, PCT/EP2013/063155, mailed Oct. 18, 2013 [3 pgs.].
WIPO, Written Opinion of the International Searching Authority, PCT/EP2013/063155, mailed Dec. 22, 2014 [5 pgs.].
Chen H. et al,, "Experiences With Scalability of Display Walls," SCIDAC, 7th Annual Immersive Projection Technology Symposium (2002), XP055186726.
Repplinger, Michael, et al, "A Flexible Adaptation Service for Distributed Rendering," Eurographics Symposium on Parallel Graphics and Visualization Jan. 1, 2009.
Repplinger, Michael, et al, "URAY: A Flexible Framework for Distributed Rendering and Display," Technical Report TR-2008-01, Dec. 19, 2008, Computer Graphics Group, Saarland University, pp. 1-19.
Third Party Observation #1 filed by Anonymous in PCT/EP2013/063167, Mar. 14, 2014 [3 pgs.].
Third Party Observation #2 filed by Anonymous in PCT/EP2013/063167, Mar. 14, 2014 [2 pgs.].
Third Party Observation #3 filed by Anonymous in PCT/EP2013/063167, Mar. 14, 2014 [5 pgs.].
Wallace, G. et al,, "Tools and Applications for Large-Scale and Display Walls," IEEE Computer Graphics and Applications, vol. 25, No. 4, Jul. 2005, pp. 24-33.
WIPO, International Preliminary Report on Patentability, mailed Dec. 23, 2014 for PCT/EP2013/063167 [11 pgs.].
WIPO, International Search Report, PCT/EP2013/063167, mailed Dec. 12, 2013 [3 pgs.].
WIPO, Written Opinion of the International Searching Authority, PCT/EP2013/063167, mailed Dec. 22, 2014 [10 pgs.].
File history of European Patent Application EP 13741682.2, downloaded Dec. 29, 2015.
File history of European Patent Application EP 13740217.8, downloaded Dec. 29, 2015.
"Papers From AVI 2012. Proceedings of the International Working Conference on Advance Visual Interfaces," WIKICFP May 22, 2012-May 26, 2012, Italy, pp. 1-4.
Liu, Yong et al, "Principle and Practice of Distributing Low and High Resolution Display Content From One Computer to Many Computers in Stand-Alone or Display Wall Configurations," Feb. 24, 2011, 'Chapter 9. Appendix B: gTiledVNC—A 22 Mega-Pixel Display Wall Desktop Using GPUs and Vnc gTiledVNC—A 22 Mega-Pixel Display Wall Desktop Using GPUs and Vnc', pp. 111-120, XP055186763.
Repplinger, Michael, et al, "DRONE: A Flexible Framework for Distributed Rendering and Display," Advances in Visual Computing, vol. 5875 of the series Lecture Notes in Computer Science pp. 975-986, Nov. 30, 2009.

* cited by examiner

METHOD AND SYSTEM FOR DISPLAYING PIXELS ON DISPLAY DEVICES

The present invention relates to a method for displaying pixels on display devices.

The present invention relates further to a system for displaying pixels on display devices and preferably for performing a method according to one of the claims 1-20.

Stereoscopic Liquid Crystal Displays in a tiled setup, so-called display walls, are more and more used as a replacement for conventional projection-based systems, in particular for Virtual Reality applications. They have the benefit of being much cheaper than projectors, have a much higher pixel density, are more energy-efficient, and do require hardly any more space than occupied by the screen itself.

Drawbacks of display walls comprising a plurality of single display devices are the visible bezels between single displays resulting in gaps in the overlay area to display on. Due to the advance in display manufacturing display bezels get increasingly thinner and enable the creation of tiled display walls in which pixels of neighboring displays are only millimeters apart.

However, one of the further major problems of the large display walls is the complicated way of producing content and displaying the content in a synchronized way across all participating display devices. For example when active-stereo content is to be presented synchronization has not only to consider a proper timestamp for displaying a virtual video frame but require also the display devices to have the left and right stereo channel separated properly for all spectators.

A conventional solution requires a variety of expensive, specialized hardware like workstation Graphics Processing Units with dedicated synchronization and video cables as well as hardware pixel processors to replicate in scale video and audio signals.

Another way to provide pixels to a display wall is the so-called daisy-chaining, where single displays not only have video inputs, but outputs, too, and each full video frame coming in is only displayed partially and passed through to the successor display, and so on. However, resolutions are usually limited to 1080p for the entire display wall, therefore the disadvantage of wasting a lot of potentially available resolutions. Conventional methods for example distribute rendering of pixels by for example sending OpenGL commands and corresponding geometry to several render servers. However, their functionalities are limited even though they include capabilities for receiving and processing user input, for example to move a virtual camera of a rendered scene.

A further conventional method uses raw pixel input and high-resolution streaming of image frames via Internet protocols and operates on a centralized management entity both pixel generators and consumers connect to.

One of the drawbacks of the above mentioned conventional frameworks respectively methods is, that they are time-consuming and require extensive back-and-forth network communication. A further disadvantage is that they do not scale well, i.e. they only work well with a very limited number of display devices and pixel generating sources.

It is therefore an objective of the present invention to provide a method and a system for displaying pixels which are more flexible respectively provide a better scaling in terms of the number of display devices and/or pixel generating sources.

It is a further objective of the present invention to provide a method and a system for displaying pixels on display devices that have reduced network communication.

It is a further objective of the present invention to provide a method and a system for displaying pixels on display devices that are more time-efficient, in particular in terms of lower latency to display pixels It is an even further objective of the present invention to provide a method and a system for displaying pixels on display devices enabling a better synchronized content presentation to a spectator resulting in a higher quality of experience for the spectator of the content.

The aforementioned objectives are accomplished by a method of claim 1 and a system of claim 21.

The method of claim 1 is characterized by the steps of
a) Generating pixel data for pixels to be displayed by one or more pixel sources,
b) Generating one or more composite virtual displays with display parameters representing one or more display devices,
c) Providing virtual pixel storage means, preferably one or more virtual frame buffers, for temporarily storing the pixel data,
d) Writing pixel data into the virtual pixel storage means by the one or more pixel sources,
e) Mapping the pixel data according to the display parameters from the one or more composite virtual displays to the display devices,
f) Transmitting the mapped pixel data stored in the virtual pixel storage means to the one or more display devices of the one or more composite virtual displays via a network based on a network transmission protocol,
g) Displaying the pixels of the transmitted pixel data on the display devices.

The system according to claim 21 is characterized by one or more pixel sources operable to generate pixel data for pixels to be displayed,
one or more entities operable to generate one or more composite virtual displays with display parameters representing one or more display devices,
storage means operable to provide virtual pixel storage means, preferably one or more virtual frame buffers, for temporarily storing the pixel data, wherein
the one or more pixel sources are operable to write pixels into the virtual pixel storage means, wherein
the virtual pixel storage means is operable to map the pixel data according to the display parameters from the one or more composite virtual displays to the display devices and to transmit the mapped pixel data stored to the one or more display devices of the one or more composite virtual displays via a network based on a network transmission protocol, wherein
and wherein the display devices are operable to display the pixels of the transmitted pixel data.

According to the invention it has been recognized that by using composite virtual displays, virtual pixel storage means and connecting them via a network enables enhanced flexibility, since for example this removes the dependence on specific hardware. The one or more composite virtual displays and the one or more virtual pixel storage means enable therefore improved flexibility and new features which may only be hard or even impossible to be implemented on conventional physical hardware. For example multiple virtual composite displays on the same hardware may be run for improved efficiency or the virtual pixel storage means and/or other composite virtual displays may be shifted between hardware instances for maintenance reasons with minimal or no down time.

According to the invention it has been further recognized that in particular combining the virtual pixel storage means and the virtual composite displays enable in an easy way a fully synchronized content presentation. For example by the virtualization of the pixel storage means and the composite display(s), the number of displays as well as the pixel storage means can be increased and placed at different locations on any entity, respectively display.

According to the invention it has been further recognized that the present invention enables replacing of conventional one-to-one hardware cable connections. Therefore costs can be reduced while flexibility is further enhanced.

According to the invention it has been even further recognized that the presentation of synchronized content is more reliable enabling a higher quality of experience for a spectator.

According to the invention it has been further recognized that this reduces the traffic for displaying pixels significantly since due to the mapping only the relevant pixel data, i.e. pixels to be displayed on the corresponding display device is transmitted to this pixel device.

Further features, advantages and preferred embodiments are described in the following subclaims.

According to a preferred embodiment the one or more display devices announce display information including characteristic display parameters of the display devices in the network, preferably characteristic inter- and intra-display parameters. For example inter-display parameters include the spatial position of every pixel of every display device relative to another display device so that the one or more composite virtual displays "know" the spatial location of each pixel and thus a reliable content presentation across virtual composite displays is enabled, independent of the resolutions and physical dimensions respectively size of each contributing display device. Even further display information may also include intra-display parameters like the local spatial position of the pixel of a display device relative to other pixels of the display device, i.e. within the display device itself. Further intra-display parameters include for example the vertical sync rate or display refresh rate or the power consumption of the display device bezel sizes, etc. Another advantage is when announcing display information in the network, further displays can simply be attached to the network and the pixel sources respectively the virtual pixel storage means may simply include this information of the further attached displays when generating or transmitting pixels so that a synchronized and reliable presentation of the generated content via all display devices is enabled.

According to a further preferred embodiment one or more pixel operations are performed prior to transmitting the pixel data and/or after transmitting the pixel data based on the display information, preferably wherein a bezel compensation operation is performed. Pixel operations may for example include color conversion, up- or down scaling, streaming, etc. For example color-conversions can be performed, if the display information includes calibrated color information of the display device so that an adaptation of certain pixels is necessary for presenting corresponding content without different color receptions by a spectator across different display devices. To enable an even higher quality of content presentation for a spectator a bezel compensation operation may be performed. The content is then presented in such a way, that bezels of displays simply cut out content at the respective location for a presentation so that the user has the perception, that the bezels of the display simply overlay the content; the user then cannot see the content "behind" the bezels of the displays devices. In this way even display walls with different bezels of each participating display device can be set up. Even further display information may include a transformational data of the physical display devices for instance enabling virtual reality applications to calculate view-dependent or other location-dependent data on the fly and use it in their rendering. Even further mobile displays like tablets updating their transformation in real-time are enabled and could be used for example to generate magnifying glass or X-ray effects for the areas of the display wall a mobile device currently covers.

According to a further preferred embodiment the one ore more display devices are organized tree-like in the one ore more virtual composite displays with one ore more master devices and one ore more slave devices wherein the displaying devices form their leaves of the tree-like organization. This enhances the flexibility, since adding or removing display devices from for example a display wall can be performed in an easy manner by simply plug off the corresponding device or plug in and adapting of the tree-like structure. Adding a "leaf" does therefore not affect other "leaves" on other "branches" of the "tree". The tree-like structure furthermore enables easy adding of functionalities defined by a sub-tree, for example to perform access control by allowing only certain pixel sources to display pixels on a certain sub-tree of the composite virtual display. As each node in this tree can be treated like a single display device with defined characteristics, even when it is comprised of multiple physical display devices represented by the leaves of its sub-tree, an abstract grouping of physical display devices is effectively provided according to specific needs of applications.

According to a further preferred embodiment, a master device is selected for holding one or more composite virtual display entities. This provides for example that one physical display holds a composite virtual display and enables connecting and sampling of information of the other display devices related to the composite virtual display for example synchronization information, information for bezel compensation or the like. Therefore managing of virtual composite displays is improved.

According to a further preferred embodiment one or more pixel processing pipelines each with one or more processing elements for performing operations on the pixel data are generated, preferably by the virtual pixel storage means and/or by one or more of the display devices. This enables an easy and exchangeable processing of operations of pixel data in the respective virtual pixel storage means, preferably a virtual frame buffer, and/or the display devices For example different virtual frame buffers may have different pixel processing pipelines so that further flexibility of the method is enhanced and operations can be performed on the pixel data in a structured way.

According to a further preferred embodiment the one or more pixel processing pipelines comprise a limited number of processing elements, wherein the processing elements are ordered within the one or more pixel processing pipelines. This enables for example an operation of a pixel processing pipeline in a following way: Pixel data or data buffers currently processed inside the pipeline by a processing element can be simultaneously shifted by one stage. For example whenever an application working on the virtual pixel storage means, i.e. writing pixels for a frame into the virtual pixel storage means, has signaled the end of writing a pixel frame, i.e. the current frame is "full", by for example issuing a End-Of-Frame event, the pixel processing pipeline may push the current frame buffer into a first processing element and the output buffers of all but the last processing element as input buffers to the respective successor processing elements. Finally the pixel processing pipeline may trigger processing in all processing elements carried out in a multi-threaded fashion simultaneously in all processing elements in order. After leaving the processing pipeline, the processed frame may be transmitted to and/or presented by the display devices.

According to a further preferred embodiment for performing step f) the pixel data to be transmitted is encoded and/or compressed, preferably wherein if the pixel data is providing for video stream, encoding is performed adaptively. By using encoding and/or compression, the amount of pixel data to be transmitted to the display devices can be reduced. This saves network resources in particular in terms of bandwidth, packet loss and/or latency. Thus presentation quality for a spectator is even further enhanced. When encoding is performed adaptively then encoding can be performed based on actual pixel data and for example combined with current network conditions so presentation of content by the display devices can be further optimized.

According to a further preferred embodiment the pixel data is color converted and/or scaled and/or streamed and/or refined and/or compressed. For example this may be performed in a pixel processing pipeline starting with scaling then color converting, compression and then streaming enabling a variety of pixel operations for enhancing the quality of content to be presented. For example in a first step inside the pixel processing pipeline scaling down of input buffers is performed to reduce the amount of raw pixels each stage has to operate on. For example, the scaling is defined through a configuration file or API, or may be dependent on where pixels maybe of each particular pixel source are displayed and whether scaling up or down on the way needed.

As an example the scale stage takes an input buffer of any resolution and scales it to the predefined output resolution for the pixel processing pipeline and with that the final stream output. Both up- and downscaling may be performed when requested, but only downscaling may be beneficial prior to transmitting the pixel data via the network to keep the required network bandwidth as low as possible. Upscaling is then only beneficial to be performed on the transmitted data. The scale stage may for example be implemented using the FFmpeg libraries for image manipulation providing facilities to do a proper scaling and pixel interpolation.

An other example for a pixel processing operation is conversion between different color spaces that may be handled by the so-called color conversion stage in a pixel processing element. For example conversion from (rendered) RGB images to YUV images as required by many video encoders may be performed.

In general stages may be as "atomic" as possible in terms of their functionality, such that exchanging just a part of the pixel processing pipeline remains possible without having to care about other, interwoven parts, too.

In order to save bandwidth the generated images or pixel data may be treated as a video stream and compressed using a suitable video encoding/decoding algorithm, for example the x264 library. When using the x264 library each image is encoded as a series of so-called NAL (Network Abstraction Layer) units as defined by the H.264 standard.

Support to further wrap the created NAL units in an MPEG Transport Stream, which is part of the MPEG-2 standard may be provided. This may be to ensure compatibility with more receiving devices.

After compressing a video stream, the compressed video stream may be streamed to the network using for example the Real-time Transport Protocol (RTP). All sessions between endpoints may be established and controlled using the Real Time Streaming Protocol (RTSP). Both protocols are standardized and widely used, so that many programs, applications and devices support playback of such streams.

According to a further preferred embodiment when the pixel operation reduces the amount of pixel data to be transmitted the processing of the pixel operation is performed on the pixel data, preferably stored in the virtual pixel storage means and/or when the pixel operation increases the amount of pixel data to be transmitted the processing of the pixel operation is performed on the transmitted pixel data. This saves network resources, in particular bandwidth since reducing of pixel data is performed prior to transmitting the pixel data to the display devices via the network and increase of pixel data like upscaling is performed after transmitting of the pixel data.

According into a further preferred embodiment an outside access interface of the virtual pixel storage means to the network is provided for pixel managing applications. This enables in a flexible way to implement further applications performing pixel operations on the pixel data in the virtual pixel storage means. Further the access interface of the virtual pixel storage means can be used to change the output display position and size of any participating stream.

According to a further preferred embodiment streamed pixel data is adapted globally and/or locally. Global adaptation means that for example when content to be encoded during a frame analysis an encoder adapts to large areas of for example similar colour by using larger macroblocks or to pattern correlations in the same or neighbouring frames by using suitable intra- or inter-frame motion vectors adaptation applied to every frame. Local adaptation is applied to a single frame or across a restricting number of consecutive frames. Local adaptation has the advantage that a more accurate adaptation to the content to be encoded is enabled. For a local adaptation an application-specific mask may be used provided for each input frame and this mask is then used by the encoded to optimize encoding parameters based on values to each pixel of the mask.

According to a further preferred embodiment for global adaptation encoding parameters of the streamed pixel data adapted towards low-latency and/or by choosing an upper bitrate limit. This reduces the bandwidth needed within the network for transmitting the pixel data when using an upper bitrate limit. If the parameters are tuned towards low-latency then the lower latency is provided when transmitting the pixel data via the network. As an example global adaptation of a video encoding for instance results in tuning x264 parameters towards general low latency encoding or by tuning x264 parameters towards low latency encoding.

According to a further preferred embodiment for a local adaptation different importance values are assigned to the pixel data, wherein the importance values are used to indicate importance of the pixels, preferably with respect to encoding. For example inside a video encoder, mask values may be used for encoding pixels of higher importance differently than those of lower importance. When for example using H.264/AVC, the corresponding encoding operates on so-called macroblocks (16×16 pixels), which are the elementary units used for motion vector estimation and quantization, the importance mask values are resampled to yield one importance value per macroblock. According to this value, any encoder parameters may be influenced that have an effect on bit rate or quality. For instance the search range for motion vectors according to the importance mask can be changed or unimportant macroblocks can be entirely skipped. In particular importance-based optimization on in the encoder pipeline may be applied in so-called the quantization step, i.e. a H.264/AVC quantization based on a given importance per pixel is adapted.

Quantization in H.264/AVC happens based on a quantization parameter (QP) that can take exactly 52 integral values, where 0 indicates lossless quantization and 51 indicates maximum compression. Based on the QP, the quantization of transform coefficients within the internal integer transform of H.264/AVC is determined. In this process, a QP value is determined per macroblock, which enables adjusting the quantization separately for each macroblock. The QP range is arranged such that an increase of the QP by 1 results in an increase of the quantization step size by approximately 12%, which in turn results in a reduction of the resulting bit rate for that macroblock by also approximately 12%.

The importance mask is then used to adjust the QP of the H.264/AVC video encoding per macroblock. Assuming the x264 library offers three modes according to which the internal strategy for choosing the QP is determined: Constant QP (CQP), setting the QP to a fixed value for all macroblocks in the encoding process, Constant Rate Factor (CRF), targeting a constant perceived quality in the output, and Constant Bit Rate (CBR), targeting a constant output bit rate. Since the CBR mode may vary too much in the output quality, which is to be to control most prominently, and the CQP mode may only allows to set the QP globally without ever changing it again, CRF is preferably used in the following. The x264 implementation of the CRF mode pins down the QP at a default medium value of 23, and adapts it according to the internal analysis of the content, e.g., in terms of movement or repetitive patterns.

According to a further preferred embodiment defined blocks of the pixel data are adapted according to the importance values by adding a correction value, preferably with respect to an encoding mechanism specific based value. This enables to modify in an easy way for example encoding mechanism specific based values: A mapping of the normalized importance parameter available for each pixel may performed—and deduced for each macroblock—to create an integral quantization parameter offset (QPO) in a configurable interval ($QPO_{min}$, $QPO_{max}$). For each macroblock, the QPO is added to the QP that is set automatically, resulting in an altered QP value. The 0.5 mask value is fixed to result in a QPO value of 0 (meaning no changes to the automatically determined QP), and then perform a simple rounded inverse linear mapping of QPO values in (0,0.5] and [0.5,1) onto (0, $QPO_{max}$) and ($QPO_{min}$, 0), respectively.

According to a further preferred embodiment before displaying the pixels the pixel data of these pixels is adapted based on quality level data. This may be used for a hybrid rendering system building on abstract quality levels (QL). A QL is then preferably defined as a visual representation of a data set, which can be independently generated on either a rendering client, a rendering server, or both. User-perceived quality increases with the level number. For example QLs are requested in order when rendering to progressively refine the visualization for the user. The process may be aborted due to interaction or a decision by the rendering system. For example, rendering the highest QL might not be feasible for a distant view. The rendering system is enabled to make such a decision. To render a level, application-specific data such as a level-of-detail (LOD) hierarchy is made available, which is referred to as quality level data (QLD). The classification of a data set in quality levels and the associated data is provided by the underlying rendering system. The server side stores all available QLs for a data set. This includes the highest levels, which a server always supports, but not necessarily every client (due to possible memory and rendering limitations). Also, levels only used by certain client rendering systems may be included. For example a renderer with reduced features may be used on a mobile device, requiring a tailored QLD.

Using quality levels allow to adaptively tailor a video stream containing rendered pixels. Using the technique, improved image quality for the user in regions of interest while adhering to the available bandwidth is provided.

According to a further preferred embodiment a rendering of pixel data provided by the pixel sources is divided between the pixel sources and display devices, wherein the fraction is determined based on display device resource capabilities. This allows in an optimized way to perform rendering on the client side and server rendering side in a very efficient way, in particular bandwidth can be saved and resources can be used efficiently. Therefore by distributing different quality levels of the visualisation to client and server for rendering flexibility is enhanced and by using client side resources scalability of the servers is improved and network resources are freed for other usage.

According to a further preferred embodiment synchronisation information, preferably including presentation time stamps, are included at the virtual pixel storage means for synchronising the display of pixels at the individual display devices of the one or more composite virtual displays. This enables to present content via the display devices in a tight synchronised manner providing a high quality of presenting experience for a user. By use of the presentation time stamps synchronising of the display devices with each other and further with the pixel sources can be provided in an easy and efficient way. For example when the presentation time stamps are included into a frame to be displayed on display devices, the presentation time stamps are mapped identically onto each display device when based on the same End-Of-Frame event and the frame is displayed synchronously on the corresponding display devices.

According to a further preferred embodiment step f) is performed via wireless and/or a cable-based network. While providing enhanced flexibility of a wireless network cable-based solutions provide low latency and therefore a high quality of experience of the presented content for a user.

According to a further preferred embodiment a plurality of view channels and/or audio channels are created within the virtual pixel storage means for the pixel data and/or for audio data and are transmitted to the one or more composite virtual displays for a presentation. This enables an even higher quality of experience for users for example stereoscopic displays and/or different audio channels for different languages if the users for example use tablet PC's with ear phones to follow a content presentation on a display wall.

There are several ways how to design and further develop the teaching of the present invention in an advantageous way. To this end, it is to be referred to the patent claims subordinate to patent claim 1 on the one hand and to the following explanation of a preferred example of an embodiment of the invention illustrated by the drawing on the other hand. In connection with the explanation of the preferred example of an embodiment of the invention by aid of the drawing, generally preferred embodiments and further developments of the teaching will be explained.

In the drawings

Figure 1:
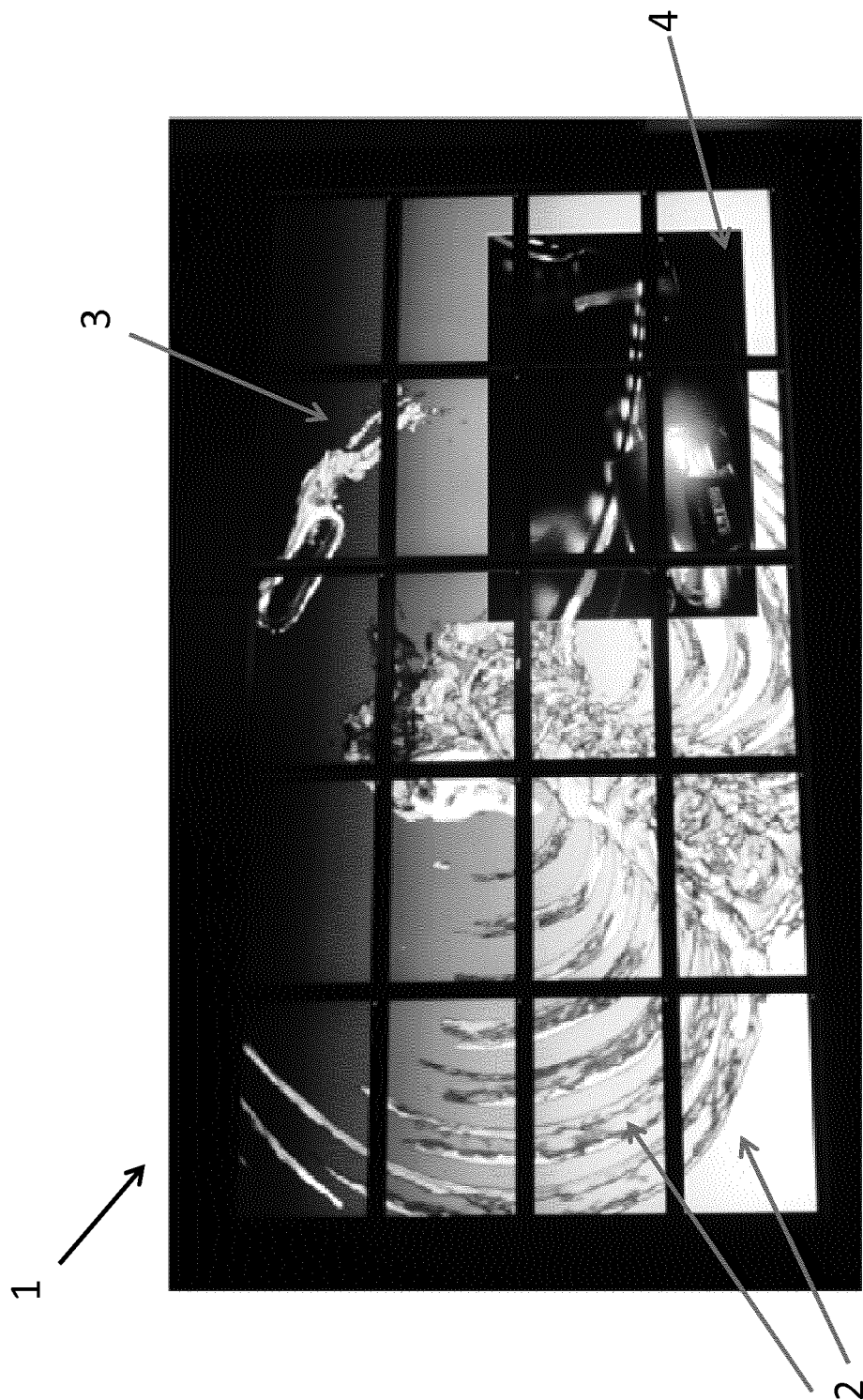
FIG. 1 shows part of a system according to a first embodiment of the present invention.

In FIG. 1 an example virtual display 1 displaying one full-screen video stream 3 of an interactive scientific visualization and a second overlay-screen of a running video 4 is shown. The virtual display 1 spans 4×5=20 physical display devices 2 parallel showing the two video streams 3,4 while simultaneously using a visual compensation. Such a virtual display (VD) 1 can consist of either a single physical display (either stationary or mobile) 2 or a whole consecutive array of those displays (i.e., a display wall). The single physical displays or display devices 2 of a virtual display VD 1 may be the conceptual unity of a screen, a network connection for receiving video streams, and a processor able to decode those video streams and present them on the screen. These features are for example present in current-generation mobile devices and "smart" LCD televisions, Nonetheless, the VD concept can be abstracted on a standard computer connected to at least one "non-smart" display. The virtual display or virtual composite display comprising a plurality of virtual displays may provide detailed information about their capabilities to the network 7, which outside entities can work with to configure and route the flow of pixel or video data. Examples for these capabilities are display size in pixels and millimeters, color depth, 3D stereo features, and exact 3D location in the coordinate system of the session. Virtual displays 1 may be addressed by their URL via the network 7, cf. FIG. 2.

Virtual displays 1 that span multiple physical hosts 2 in the network 7 may be created by attaching to an already existing single-host VD and extending it. On a service level, the first, original VD service may represent the entire compound of child display devices towards the network 7. Each VD may be composed of child VDs representing the combined properties of all its children virtual displays towards the outside in particular the network 7. All message communication traverses the virtual display hierarchy formed like this, video streaming however is done in a direct peer-to-peer fashion between pixel generators or pixel sources and the VDs located at the leaves of this tree hierarchy. In short, VDs provide the interface to communicate with one physical display 2 in the very same way as with multiple display devices 2 forming a consecutive display wall 1. To the outside, a composite VD may act as one large display spanning all the participating smaller displays, only for receiving video streams the leaf VDs are reachable, too. To the inside, the composite VD communicates with its child virtual displays, collects and assembles their information to synthesize its own, and does the book-keeping for all things related to the composite (e.g., synchronization, information for bezel compensation). One physical display 2 that holds the VD entity representing the composite may be selected as display master device DM.

Preferably during display device configuration, each participating VD may make its physical size in pixels and millimeters as well as its absolute 3D transformation available to the outside within its service description. This way, within a composite VD, pixel operations like bezel compensation cutting away pixels "covered" by the framing of single displays can be performed automatically and preferably completely transparent for a service consumer. This way, even heterogeneous display walls 1 with different pixel densities on each participating screen respectively display device 2 can be set up. Also, the available transformational data of the physical displays 2 for instance enables Virtual Reality applications to calculate view frustums or other location-dependent data on-the-fly and use it in their rendering. Even tracked mobile displays like tablets that update their transformation in real-time are feasible and could be used, for example, to generate magnifying glass or X-ray effects for the areas of a display wall 1 the mobile device currently covers.

To display streaming content in spatial and temporal alignment across a composite VD, synchronization at the VD end may be employed.

Figure 2:
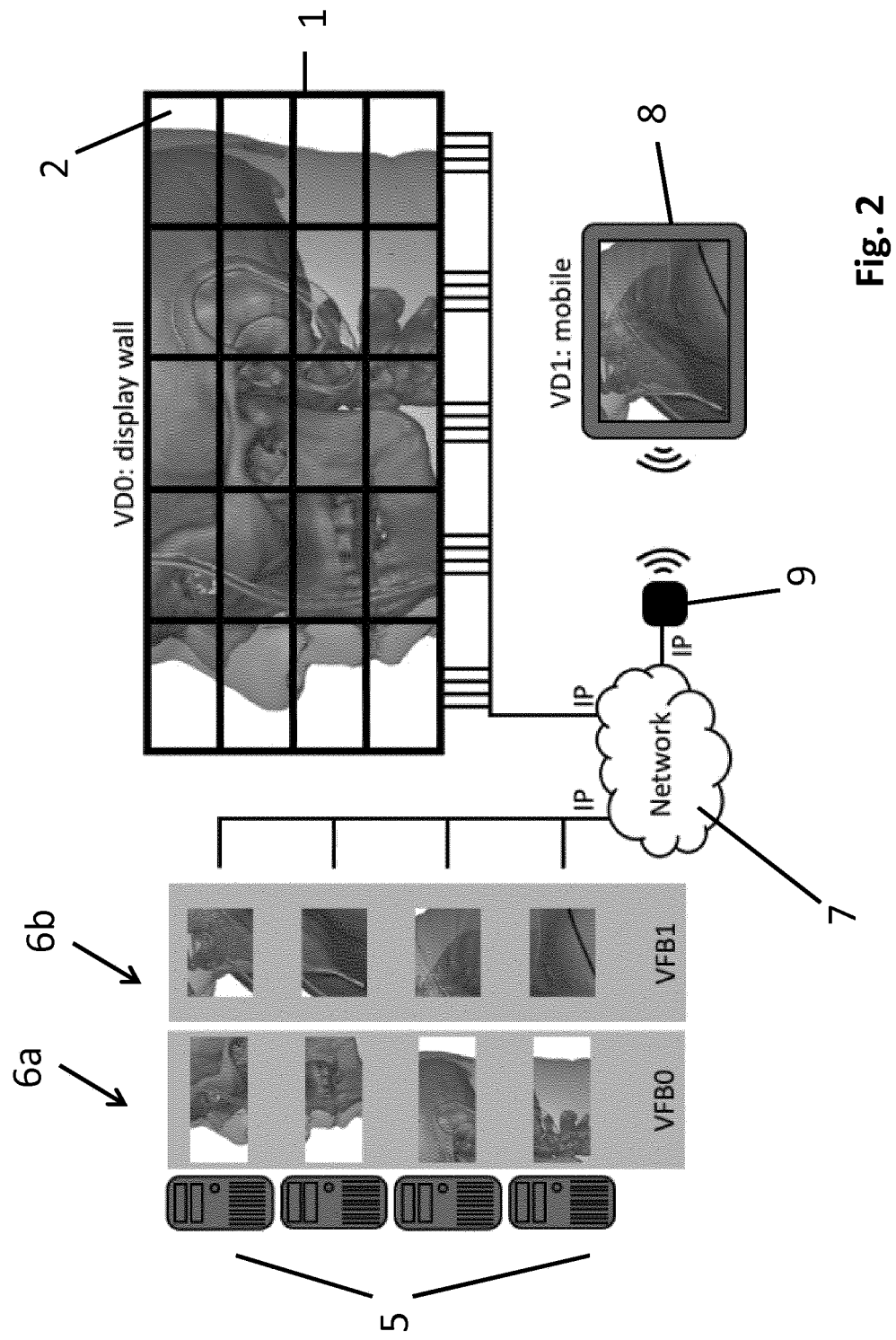
FIG. 2 shows schematically a system according to a second embodiment of the present invention.

A Virtual Frame buffer 6a, 6b, abbreviated in the description with VFB as an example for a virtual pixel storage means and on the "side" of the pixel sources 5, cf. FIG. 2, may be requested by a pixel-generating application as a resource to write its pixels into. As such, they are the points where new pixel data to be displayed anywhere is entered. For an application, this may be done by providing a global identifier and format information (e.g., resolution or color depth) and the application is assigned a memory region to write its pixels to. If a VFB 6a, 6b should be shared among several processes or even network locations, applications can attach to a previously created VFB, and just specify for example a quadrangular region within the whole buffer they want to be responsible for. What an application has to do afterwards is write pixels into the VFB 6a, 6b and signal it whenever it has finished writing a frame e.g. by an end-of-frame signal. Pixel operations on those frames (e.g., scaling or color conversion) as well as real-time video encoding and streaming may be performed in the background not visible to a service consumer.

If a VD is connected to a VFB its internal hierarchy of potential sub-VDs may become available and may be then used to stream the video directly to each of the leaves, i.e. display devices 2. In doing so, the VFB performs the splitting up and scaling of input pixel frames, performs bezel compensation along the way according to the configuration of the connected VD. Network bandwidth may be saved by performing only downscaling of the input pixels at the VFB end, but scaling up at the VD location after transmission via the network 7.

Regarding the resolution to write into a VFB there are no limitations as many pixels as required may be requested and filled, however the performance and memory properties of the host both the application and the (partial) VFB are running on are possible limiting factors. Applications may provide timestamps with their frames, which then can be used directly to insert them in all video streams originating from the same frame of pixels, determined by the same End-Of-Frame event, and to synchronize their playback at the VD end. Further, VFBs can access a pixel clock of one of their connected VDs or of a display device 2 and may make use of it. Usage scenarios include, for example, limiting the frame rate of produced frames to the one the display device operates in, or locking/synchronizing the frame generation to a 120 Hz active stereo frame rate.

VFBs are not limited to a single array of pixels to receive from an application and send out to VDs per frame, but can work on multiple frames simultaneously in what is called in the following as separate channels of the VFB. Each channel may represent one view of a multi-view setup, for example one eye of a two-channel stereo VFB, or one view of a multi-channel VFB to display for example on an autostereoscopic VD later. In a VFB with more than one channel, the end-of-frame signal from the application—and the potentially given presentation timestamp for this frame—indicates the finalization and initiates the internal processing for all channels of that VFB. So frames e.g. for the left and right eye of a stereo VFB, all end up with the exact same presentation timestamp at each simulation instant. The separate channels, although matching in size and position, are however provided as separate streams at the VFB, such that VDs can operate in whichever way they like on the available channels and, for example, show only the rendering for the left eye of a stereo VFB on a control monitor but use both channels on a stereo-capable VD.

A VD may use whichever stereo channel separation technique to fuse the two separate streams into a stereo output again, for example show the unmodified streams on two differently polarized projectors, perform spatial interleaving for line-by-line passive stereo or frame interleaving for active-stereo shutter glasses by using the timestamps within the video streams uniquely identifying the correlating frames within the streams for each channel.

FIG. 2 shows schematically a system according to a second embodiment of the present invention.

In FIG. 2 concepts of virtual frame buffers and virtual display with an example scenario showing the scientific visualization running into two distributed frame buffers for different output virtual displays are shown.

In FIG. 2 four render servers 5 are shown which write into two virtual frame buffers 6a and 6b. A virtual frame buffer 6a, 6b is requested by for example a pixel generating application as resource to write pixels into. To provide the pixel data of the virtual frame buffers 6a, 6b to a display wall 1 and to a mobile device 8 for presentation the render servers 5 respectively the virtual frame buffers 6a, 6b hosted on one or more of the render servers 5 are connected via a network 7 based on the IP-protocol to display devices 2 of the display wall 1 and via a WLAN access point 9 to the mobile device 8 for presentation. The virtual frame buffers 6a and 6b may be shared among several processes or network locations so that an application may attach to the virtual frame buffers 6a and 6b and for example just specify the quadrangular region within the hole virtual frame buffer 6a, 6b they want to be responsible for. When the composite virtual display 1 respectively the display wall 1 is connected to the virtual frame buffers 6a and 6b and is used to stream the video of the render servers 5 directly to the displays 2 of the display wall 1, the virtual frame buffers 6a and 6b preferably perform the necessary splitting up and scaling of input pixel frames, performing a visual compensation along the way according to the configuration of the displays 1, 8 connected to the virtual frame buffers 6a and 6b. In particular downscaling of input pixels is performed at the virtual frame buffers 6a, 6b and scaling up is performed at the display devices 2 respectively the mobile device 8 reducing pixel data traffic within the network 7.

An application that wants to push pixels into a system for displaying pixels may request a VFB entity through an API, and may start pushing arrays of pixels to it. Henceforth, the only tasks remaining for the application are informing the VFB whenever a full frame of pixels has been provided, preferably issuing an End-Of-Frame message and notifying it when starting and stopping the pixel stream. Even though the system may provide advanced facilities for applications to interact with a VFB, e.g., request more than one channel, provide an additional application timestamp, or receive function calls for events like resizing of the pixels at the display end, all of these are optional and the basic code to connect an application to the system is minimal. The following snippet of C++ code shows this minimal usage of a VFB in an application:

```
// Initialize VFB, providing some pixel
// format, no. of channels, etc. (omitted).
auto_ptr<DaaS::VFB> vfb = VFB::create(...);
vfb->signalStart( ); // Signal start.
while (!some_exit_condition) // Main loop.
{
  // Fill VFB channel 0.
  unsigned char* pixels = vfb->getBuffer(0);
  pixels = ...; // Write pixel data.
  vfb->signalEOF( ); // Signal end of frame.
}
vfb->signalEnd( ); // Signal end.
```

Whenever an End-Of-Frame signal is received from the application, the current content of all buffers in all channels is passed to a buffer distributor.

A buffer distributor may be provided once in each VFB and is the first component that receives a pixel buffer from the outside, i.e. is from a pixel-generating application. It furthermore has the knowledge of all connected VDs, their physical properties, spatial layout and channel processing capacities. Using that knowledge, the buffer distributor takes the incoming pixel frames, splits them up accordingly, and pushes the resulting sub-buffers into pixel processing pipelines or transport pipelines, which are generated whenever a VD connects to the VFB according to its layout.

As with all concrete processing components, the transport pipelines are preferably hidden from the application, but implemented in the VFB. Whenever a VD is connected to a VFB, at least one transport pipeline may be created e.g. when streaming the entire VFB frame to a single-host VD. There can be many more pipelines when dealing with a multi-display VD, a multi-channel VFB, or a combination of both, all of which resulting in streaming only parts of the VFB pixels to distinct leaf VD entities.

Each transport pipeline comprises single processing elements also called pipeline stages. These stages may be daisy-chained inside the transport pipeline, such that each stage receives the result of its predecessor stage, with the first stage directly receiving pixels from the buffer distributor and the last stage releasing its output data to the network 7 in order to be received by display devices 2.

Stages implemented may be used for streaming the pixel content of an application to the network 7: First, the pixel array might need scaling, as the size of the pixel rectangle displayed at the receiving end might be (a lot) smaller than the rectangle originally pushed into the VFB. Then, in order to prepare the data for the later stages, a color conversion may be performed, because applications typically provide their pixels one by one (a packed RGB format), but video coding algorithms typically need them as separate luminance and chrominance planes (a planar YUV format). Afterwards, the actual video coding using an appropriate codec, for example the H.264 codec, may take place, which transforms simple pixel frames into continuous, interdependent video frames, hereby reducing their size significantly. Finally, those video frames may be provided on a dedicated network port for display devices 2 to connect to and ultimately present the video stream. Freely exchanging stages are enabled as long as input and output data formats remain identical, i.e. parts of the processing pipeline may be exchanged with different implementations respectively processing elements.

A Virtual Display service receives video streams, at least if no further VD children are present, that is, they are leaves in their VD hierarchy. VDs may make use of the transport pipelines within which they use new stages for receiving buffers and performing for example H.264 decoding, but are able to reuse the exact scale and color conversion stages from the VFB end. Transport pipelines at the VD end may be created only on direct interaction from an outside service consumer, which initiates the mapping of an external video stream to the VD in question. So the request to create a new transport pipeline may be either triggered from the external service consumer directly, or from the direct VD parent in the hierarchy. All pipelines at the receiving end up having a stream of raw pixels to display, which they do in the back-end implementation of the VD.

The back-end of a VD is a component that does the actual drawing of pixels onto the screen of the display devices. Multiple back-ends per host and processor may be employed, like this allowing for a standard PC and multiple attached screens to emulate "smart" displays. When a back-end needs to display multiple video streams at the same time, it holds multiple so-called canvases or projections, each of which representing the rectangular portion of an incoming video stream displayed on its VD. A display wall VD e.g. consisting of four displays and displaying a full-screen stream across the entire screen space, would have overall four back-end instances and one canvas per back-end showing, each displaying a quarter of the video stream. Canvases in addition have a z-coordinate, so they can be correctly sorted in overlapping cases as for example shown in FIG. 1.

The back-end and canvases are abstract interfaces and can be implemented in many ways, e.g. by using OpenSceneGraph or the like. At this, each back-end is realized as a full-screen OpenGL render window with each canvas being a screen-aligned quad showing a video texture of the pixel content. Those entities are also where so-called swaplock and framelock portions may be provided: the OpenGL buffer swap may be locked to the swap interval of the display master of the VD and, presentation timestamps, abbreviated with PTS, within incoming video streams are used to either drop the current frame—PTS in the past—or wait until the presentation time is closest to the next buffer swap, i.e. PTS in the future.

Figure 3:
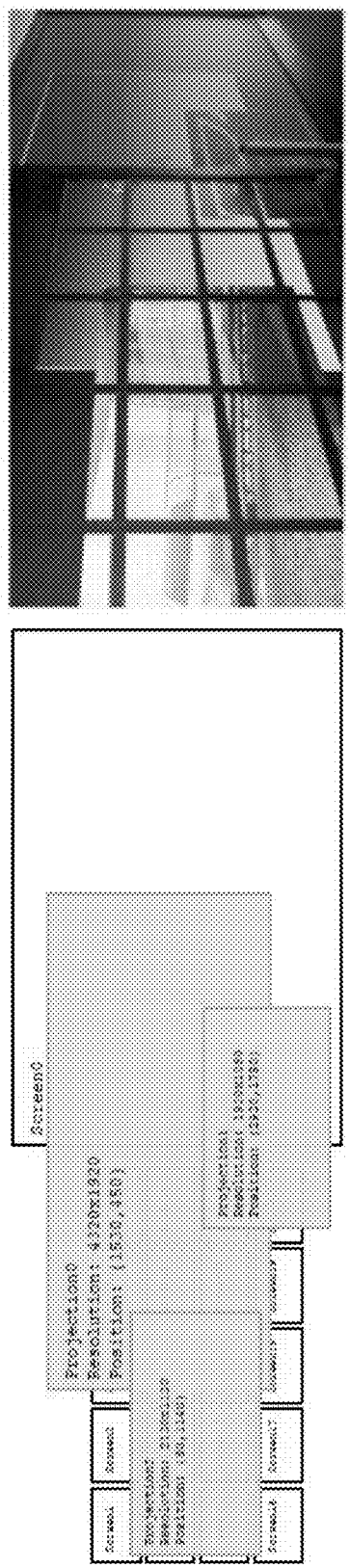
FIG. 3 shows part of a system according to a third embodiment of the present invention, schematically on the left and on the right in reality.

FIG. 3 shows part of a system according to a third embodiment of the present invention schematically on the left and on the right in reality.

In FIG. 3 on the left side a screenshot of a web interface acting as a service consumer is shown mapping virtual frame buffers to a virtual display comprising 20 display devices forming a display wall and an adjacent projection screen whereas on the right side a photo of this configuration with three running virtual frame buffers is shown. The mapping of the virtual frame buffers to the virtual display is independent of the pixel density of the output physical displays, for example the display wall has a pixel density of 107 ppi whereas the projection has a pixel density of 15 ppi.

Virtual pixel storage means and virtual composite displays may be for example implemented in C++ on Linux and Windows using a platform-independent communication frame work for communication. The virtual frame buffer is used for writing pixels into and feed them for streaming to the network and the composite virtual display is responsible for receiving video streams and for displaying the streams on the output devices, i.e. the display devices. Further a web-based management interface may be provided and may act as an example service consumer providing a simple means to map available virtual frame buffers to available virtual displays.

Using service interfaces or mapping interfaces provided by VFBs and VDs, service consumers can create mappings from pixels generated somewhere in the network to display devices displaying those pixels. Mappings are created e.g. in a browser in the browser by dragging VFB representations onto VD representations and resizing and repositioning them arbitrarily. The result is shown immediately on the respective output devices that are part of the VD. FIG. 3 shows therefore a screenshot of a scenario consisting of three VFBs mapped onto a 21-screen VD both in the browser configuration interface and in the resulting real-world scenario.

FIG. 3 all three VFBs available are mapped to the screen originate from an Intel Core i7 quad-core laptop connected to the rest of the system via Wi-Fi: two VFBs are created by two instances of an application that reads a video file, decodes it and writes the decoded frames to the VFB, the third VFB is created by a volume visualization application rendering a "Visible Human" dataset into a VFB.

As shown in FIG. 3 bezels and gaps around the installations respecting display devices are being correctly compensated just by evaluating the absolute transformational properties of each participating VD. Synchronization of the content to be presented may be provided, for example by using a method based on the "reverse genlock"-principle or simply by using dedicated conventional wiring in particular between pixel sources and pixel sinks. When using a wireless connection between the pixel sources and the pixel sinks for transmitting content to be presented this may lead to occasional frame drops, which are then correctly handled by the synchronization continuing to show the previous frame, but are visually acceptable for spectators. A wireless error correction scheme making up for the UDP transmission protocol in use may be employed to reduce frame drops respecting enchance a corresponding compensation. The overall latency of each VFB is also a trade-off with respect to the frame loss occurring on the connection: configuring a lower offset from the presentation timestamp at frame generation until its presentation at the display means a lower latency, but also more frames that cannot reach this deadline and are dropped. E.g. a configured offset/delay of 100 ms in the local network provides good visual results. However this presentation offset may be dynamically adapted e.g. according to the load of the VFB host and the network. In addition, hardware-supported pixel operations like encoding in the VFB may be used to lower the time spent in the transport pipeline significantly.

Figure 4:
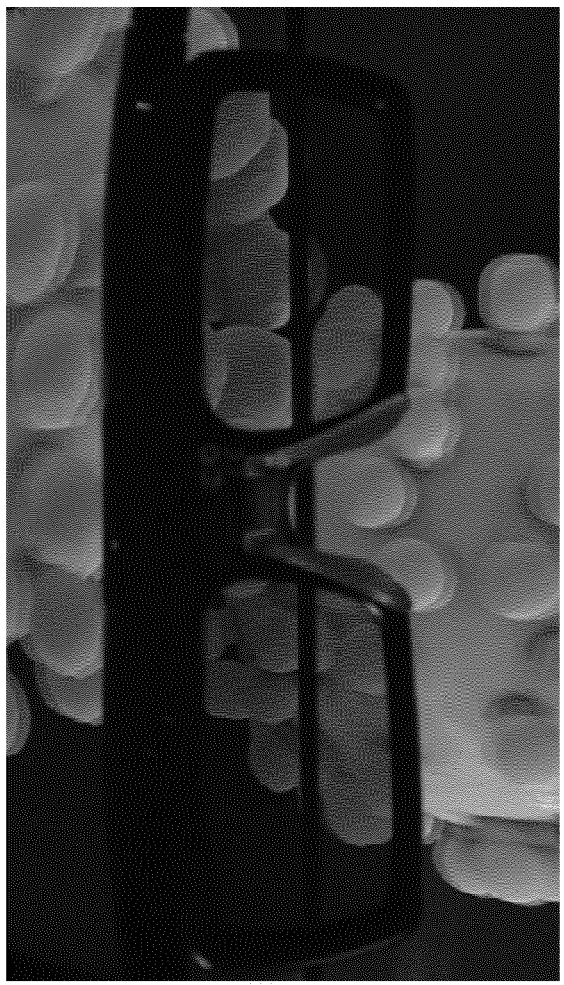
FIG. 4 shows part of a system according to a fourth embodiment of the present invention.

FIG. 4 shows part of a system according to a fourth embodiment of the present invention.

In FIG. 4 a close up of an 8 mm bezel within a three-dimensional stereoscopic demonstrator is shown. By using the shutter glasses correct stereo channels separation on two adjacent screens outside both channels simultaneously is shown.

In FIG. 4 three-screen setup using e.g. commercial off-the-shelf stereo TV sets, with removed outer rim, resulting in a very thin bezel of only 8 mm between pixels of neighboring screen. Attached to those screens are three instances of an Intel CE set-top box, one for each screen. Stereoscopic channel separation happens using active 120 Hz stereo. The content to be displayed is written on a separate machine into a two-channel VFB, which is mapped full-screen onto the three-screen VD. FIG. 4 shows the bezels and the resulting channel separation of this setup in a closeup picture.

Figure 5:
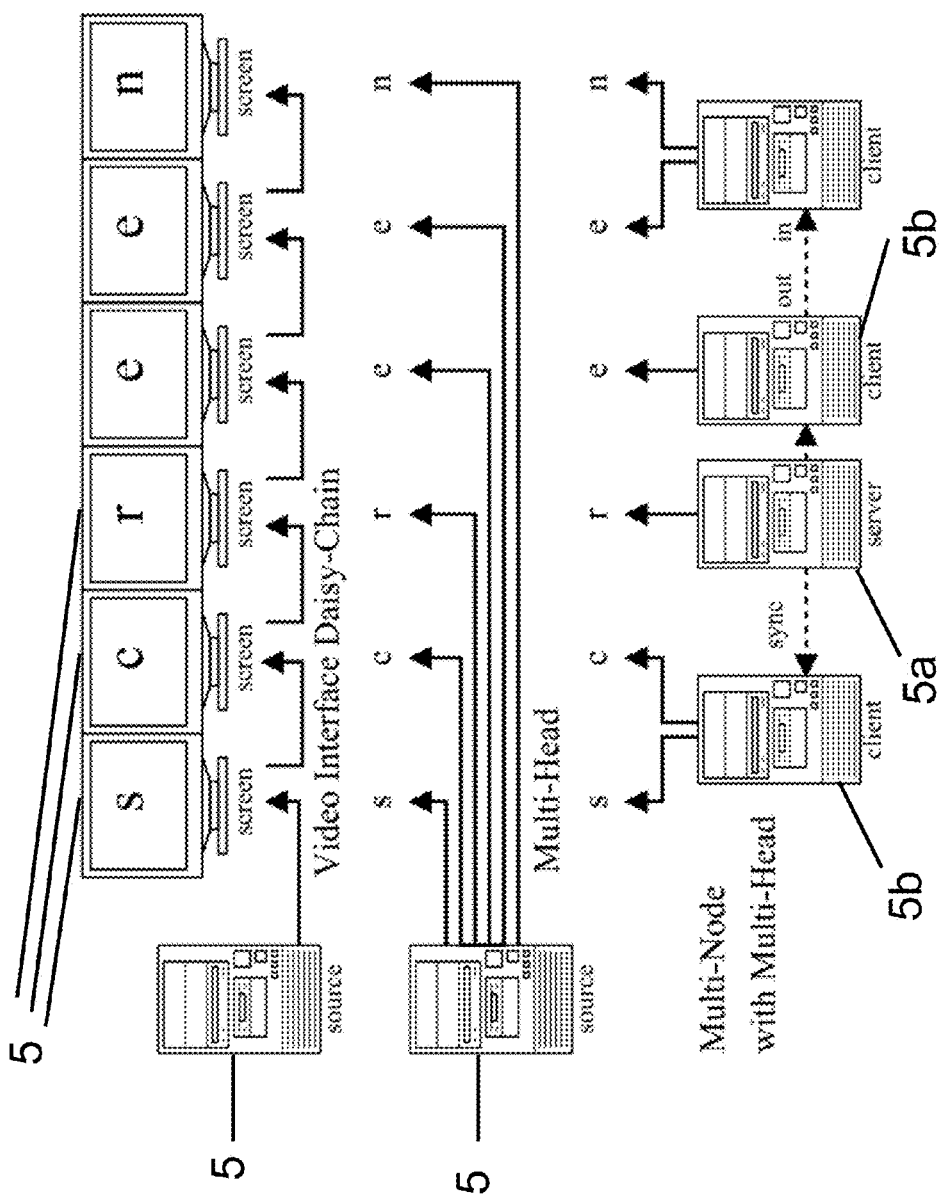
FIG. 5 shows conventional systems for displaying pixels.

FIG. 5 shows conventional systems for displaying pixels.

In FIG. 5 hardware wall clock solutions differing in complexity and video bandwidth are shown. On the top a so-called daisy-chain video interface, in the middle a multi-head video interface and on the bottom a multi-node with multi-head video interface is shown.

Daisy-chain uses a sequential connection from a pixel source 5 to a first screen 2, from a first screen to a second screen and so on. Multi-head uses one pixel source 5 and corresponding one-to-one connections between the pixel source 5 and each corresponding screen 2.

Multi-node with multi-head is shown on the bottom of FIG. 5. A server 5a synchronizes with clients 5b for displaying pixels on the screens 2. Each of the clients 5b has multi-head connections to corresponding screens 2. Further the server 5a has also one or more one-to-one connections for displaying pixels to corresponding screens 2.

In other words in the case of daisy-chaining and multi-head there is one single local quartz crystal oscillator involved serving as the wall clock. In daisy-chaining a single video signal, for example a HDMI signal, is repeated by the displays with possibly introducing some delay. In the same way a multi-head based system is clocked from a single local quartz crystal oscillator on a multi-head graphic processing unit for example. In case of multi-node systems a dedicated wiring is necessary for frame lock of the independent systems. A synchronization signal from the master clock device 5a to a number of slave display systems 5b is used.

If for example pixel sources are provided in form of personal computers images drawn in the display devices are usually generated at some rate by the directly connected graphics device. Upon reception of pixel or image data the display device refreshes the currently shown image with this data. Although physical creation of a visible image on nowadays liquid crystal display replacing the predominant former displays of cathode-ray tubes, the format of the pixel data transmitted to the display is following the VGA-standard.

Figure 6:
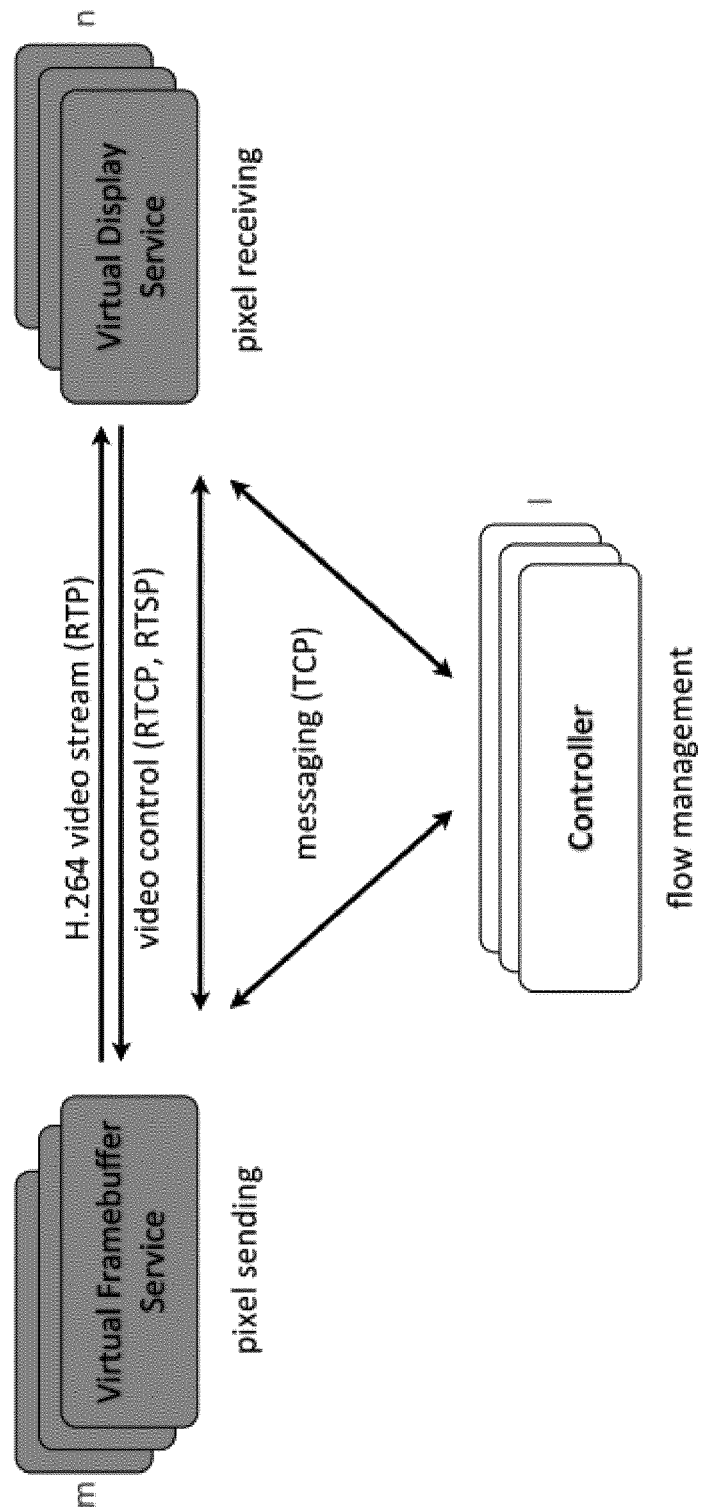
FIG. 6 shows part of a system according to a fifth embodiment of the present invention.

FIG. 6 shows a system according to a fifth embodiment of the present invention.

In FIG. 6 components of a system for displaying pixels on a service level are shown.

On the left upper side a virtual frame buffer service providing m virtual frame buffers with m>=1 and on the upper right side a virtual display service providing n virtual displays with n>=1 is shown.

To present content, an application requests the virtual frame buffer service and the virtual frame buffer service provides the requested one or more virtual frame buffers for the application to write pixel into. One or more virtual displays are linked with one or more virtual frame buffers, so that pixels written into a number of virtual frame buffers are destined to be transmitted to the linked virtual displays and therefore be displayed by one or more physical display devices linked with corresponding virtual displays. Therefore a m-to-n connection is enabled.

For transmitting the content to the virtual display(s) a H.264 compressed video stream based on RTP may be used. For video control the virtual displays may communicate with the virtual frame buffer(s). All corresponding sessions between these endpoints may be established and controlled using the Real Time Streaming Protocol (RTSP) or the Real Time Control Protocol (RTCP).

Figure 7:
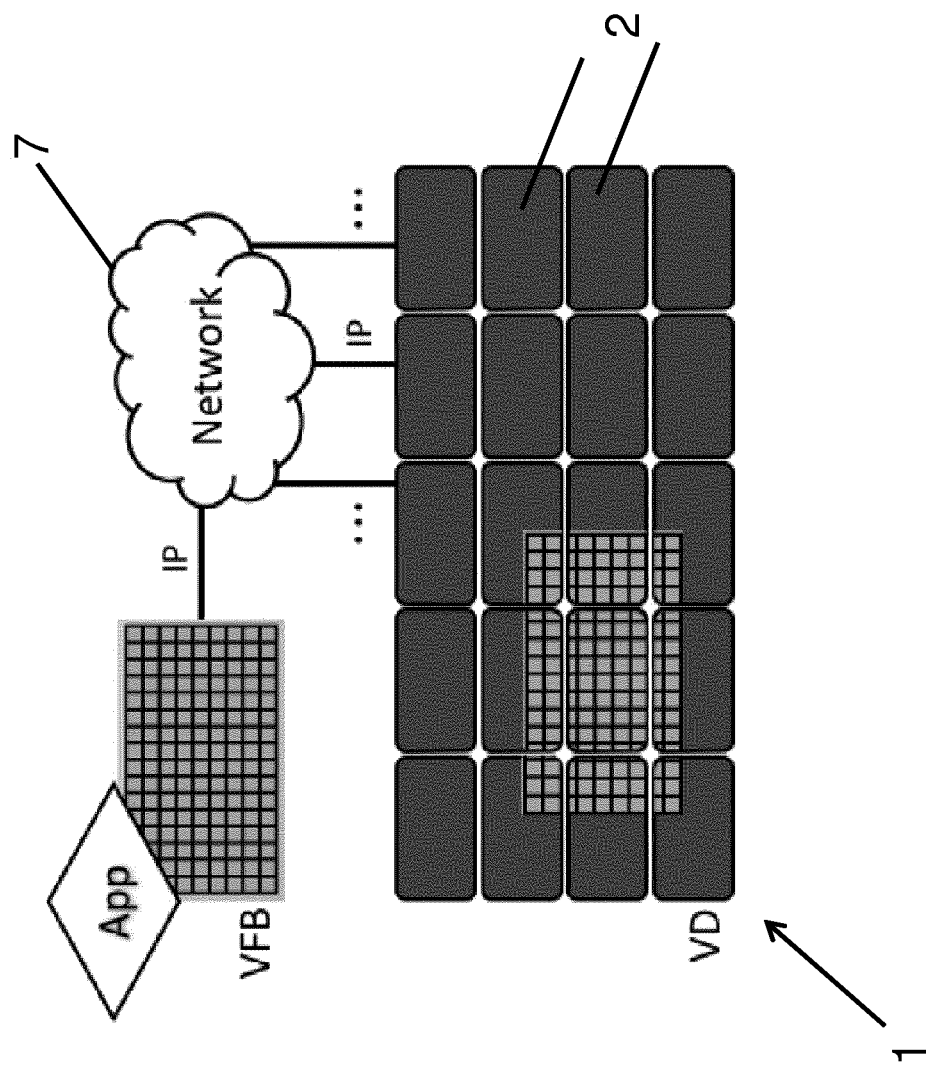
FIG. 7 shows part of a system according to a sixth embodiment of the present invention.

For flow management a number I of controllers may be established communicating or exchanging messages with the virtual displays and the virtual frame buffers via a network based on TCP messages FIG. 7 shows part of a system according to a sixth embodiment of the present invention.

In FIG. 7 an application App is shown writing pixels into a virtual frame buffer VFB which is mapped via an IP-network 7 to a virtual display 1 forming a display wall for presenting the content of the virtual frame buffer VFB. For example, the virtual frame buffer VFB is used by applications to provide content to the composite virtual display 1 for presentation. A new virtual frame buffer VFB may be requested by an application and may be specified the resolution and the number of channels for multi-view setups may also be specified. The resulting frame buffer may be made automatically available on the network 7, preferably the internet. Internally a virtual frame buffer VFB keeps track of all connected physical display devices 2 and corresponding pixel mappings. For each display device 2 a dedicated transport headline may be created to encode for example optimized H.264/AVC and stream according to RTP the content to be displayed. In detail as example for a hardware setup, a mid-range laptop with a display wall made from 4×5 tiled LCD displays is used. To evaluate stereo sync, a smaller wall using three active stereo consumer TV sets with thin bezels was used.

The laptop was used able to stream a 1080p24 signal via an equivalent VFB that was mapped to a VD spanning the 20 screen wall using a 802.11n WiFi network.

The VFB was split into 20 tiles of 270×384 pixels each, which are separately encoded, streamed, and displayed fully synchronized across the entire display wall 1. Therefore e.g. conference/meeting setups with large displays walls 1 can easily be handled. A purely CPU- and software-based encoder was used and a second 1080p24 VFB was added simultaneously streaming from the same laptop to the same display wall 1.

When using a wired LAN instead of WiFi, an end-to-end latency (time between a frame having been written into a VFB until it is displayed) of less than 10 ms was measured, which is sufficient even for highly interactive content. Of course, latency can vary depending on the complexity of the image stream to be encoded e.g. in software, available processing power, and current network load.

For the above setup of 20 streams, an average bitrate of 15.84 Mbit/s was measured where the input came from a number of different interactive applications, including games. Therefore an even "old" 100 Mbit/s network can sustain up to 6 such streams (>60 streams for a 1 Gbit/s network), which is enough for most use cases. In the case of larger numbers of displays, 10 Gbit/s network technology is available at reasonable prices and can therefore sustain well over 100 displays even at much higher bit rate settings.

Therefore virtualizing displays even over standard networks like WiFi or LANs are able to provide acceptable latency, bandwidth, synchronicity, as well as processing load even with unoptimized en/de-coding and are significantly cheaper and more flexible than conventional systems.

Further time-critical stages of the transport pipeline preferably most prominently the H.264/AVC encoding as example for a video codec in general may be accelerated by using hardware support, further reducing end-to-end latency for critical real-time applications.

Even further alternative encodings and transport protocols for improved efficiency and guaranteed Quality of Service (QoS) may be used. For complete and possibly immersive multimedia experiences spatialized audio as well as the low-latency input events in the reverse direction from user interface devices co-located with the displays device may be implemented.

Figure 8:
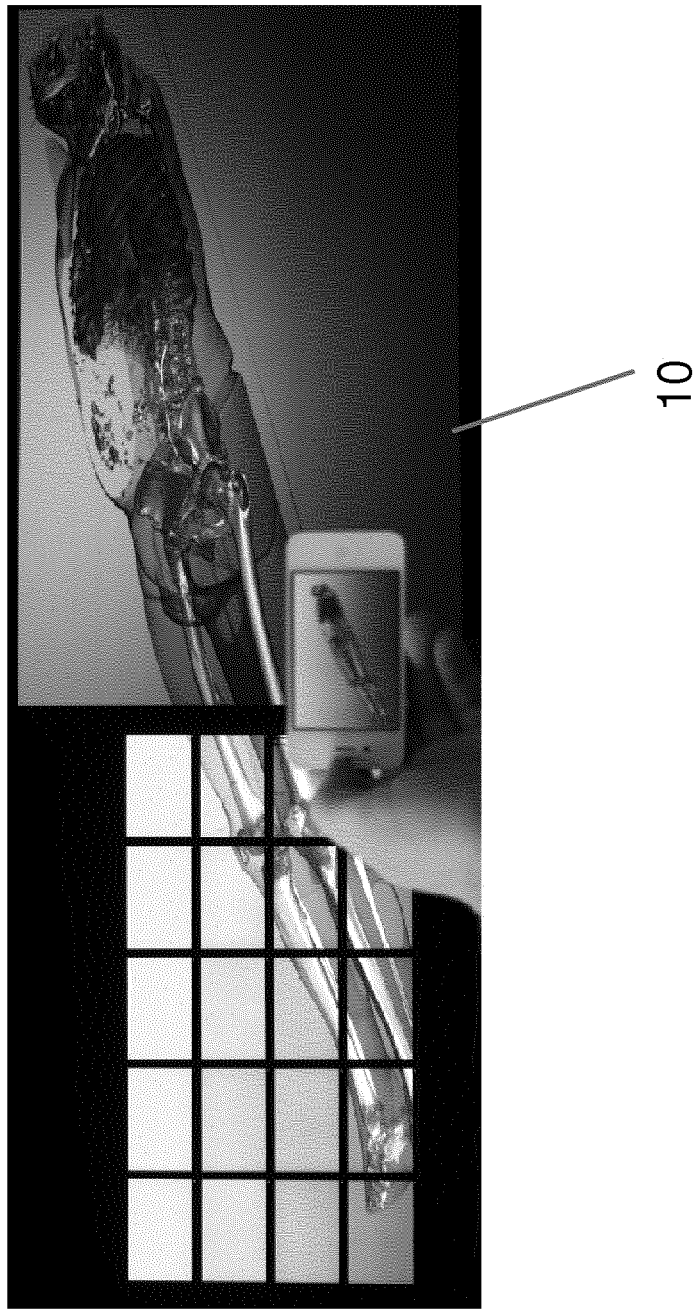
FIG. 8 shows a visualization of content of a method according to a seventh embodiment of the present invention.

FIG. 8 shows a visualization of content by a method according to seventh embodiment of the present invention.

In FIG. 8 an implementation of a scalable hybrid visualization system comprising 20 high-resolution, 31" monitors and a back projection screen is shown.

When an interactive visualization of large data sets on a set of display devices with various capabilities has to be provided a conventional solution would be to perform a rendering on a rendering server and stream images and video to the corresponding client device, i.e. the display devices. However, when using low bandwidth connections to deliver high quality visualizations in a minimum amount of time and performance limitations on the server side when delivering results to multiple display devices simultaneously is challenging.

In FIG. 8 a hybrid rendering system combining remote and local rendering is used for displaying the content 10. Minimal latency using a network efficient video stream may be achieved. Further a pixel importance parameter is used extracted from both the pixel data set and if applicable user input. By using the importance parameter video encoding can be controlled for a more efficient usage of the available network bandwidth providing visually improved spectator experience. Further, scaling is improved reaching from hand held devices to large display walls comprising many independent display devices respectively screens. To reduce server load and/or efficient usage of limited network resources and display synchronization the concept of the pixel importance is used which is for example passed into a H-264/AVC video encoder to focus the available bandwidth even to a reduction in bandwidth requirements and improving the image quality. Further a display swap lock, preferably software based, is implemented to enable active stereo content without additional synchronization hardware preferably by controlling crystal oscillators of the graphic hardware through a UDP-based system. Further, the server scalability is improved and the client's response time by balancing rendering work load between clients and rendering servers.

As mentioned above a VFB may be requested by a pixel-generating application as a resource to write its pixels into. This may be done by providing a global identifier and format information (e.g., resolution or color depth) and by assigning the application a memory region to write its pixels to. If a VFB should be shared among several processes or even network locations, applications can attach to a previously created VFB, and just specify the quadrangular region within the whole buffer they want to be responsible for. The application then signals the VFB whenever it has finished writing a frame, by a so-called End-Of-Frame event. In the background pixel operations on those frames, e.g., scaling or color conversion as well as real-time video encoding may be performed, preferably only when the corresponding frame is dedicated for being presented. If at least one service consumer is connected, the VFB may also perform video streaming to a rendering system.

Further a VD may represent a single consecutive area of pixels that can be used as a whole to present pixels on. Thus, a VD may comprise either a single physical display (either stationary or mobile) or a whole consecutive array of those displays (i.e., a display wall). The single displays of a VD may be seen as a conceptual unity of a screen, a network connection for receiving video streams, and a processor able to decode and present those video streams. This is usually present in current-generation mobile devices and "smart" LCD televisions. Nonetheless, the VD concept may be abstracted on a computer connected to at least one "non-smart" display. As with the VFB, VDs that span multiple processes in the network may be created by attaching to an already existing VD and, in this case, extending it. To display streaming content in perfect spatial and temporal alignment across a VD consisting of multiple displays, multiple layers of synchronization at the VFB and/or VD ends may be employed All VDs may have the very basic functionality to act as a pixel sink, which straightforwardly displays incoming pixels. However, if their hardware is powerful enough, VDs can also be more intelligent and take over rendering functionality from the server side. For doing this, VDs can implement not only the video channel required to receive pixels but an additional channel to receive data required to render locally. This data is sent from the rendering server and transparently interleaved with the video stream. Once enough data is available rendering workload may be split between a client and a server.

The system further includes renderer and interaction components. A renderer component is responsible for creating imagery out of input data, preferably on both the server and the client. Interaction components may replicate interaction events to all renderer instances participating in content generation for the VD in front of which the interaction is taking place. However, interaction events may be received from multiple clients, i.e. several users collaboratively exploring a display wall visualization using mobile clients.

One of the main metrics to measure the performance of interactive real-time applications is the timespan between image generation and presentation, the so-called end-to-end latency. The latency may add up from the moment an application sends an end-of-frame signal to a VFB, while doing image encoding and streaming, during network transport, stream reception and decoding, and, finally, presentation of the decoded pixels. The major time consumer within this processing pipeline may be the video encoding wherein encoding may be performed using the H.264/AVC standard in its software implementation within the VideoLAN x264 library. Even without any application-specific adaptations, x264 features high-quality, standard-compliant encoding in low latency modes. Nonetheless, the quality bit rate ratio may be improved by further exploiting information that is impossible for a video encoder to know at any point in the encoding process. By doing this, a lower bit rate, i.e. a lower network load, may be achieved while maintaining the same perceived quality, or a higher perceived quality, i.e., a visually better image presentation while maintaining the same bit rate.

Adaptation towards the content data to be encoded may happen automatically during the standard stages of video encoding: for example, during frame analysis, the encoder adapts to large areas of similar color by using larger macroblocks, or it adapts to pattern correlations in the same or neighboring frames by using suitable intra- or inter-frame motion vectors. Two adaptation types may be used: global adaptation, which is applied to every frame alike, and local adaptation, which is applied to a single frame alike or across a restricted number of consecutive frames. Global adaptation of the video encoding is performed for instance by tuning the x264 parameters towards general low-latency encoding, or by choosing an upper bit rate limit the encoder must never exceed. More accurate adaptation to the content to be encoded is only possible with local adaptation.

Local adaptation usually happens using an application-specific mask provided for each input frame, which is then used by the encoder to optimize encoding parameters based on the values assigned to each pixel of the mask. Here a simple normalized float value per pixel may be used to indicate importance of the respective pixel. Mask and image do not necessarily have to match in resolution, but the mask size could be a regular subsampling of the image size. A plethora of information can be encoded in such an importance mask: rendering information, e.g., scene depth, object identifiers, object curvature, or edges or user information, e.g., region of interest or selected object. While both types are usually independent of the color pixel buffer produced, the former type can be extracted automatically from the renderer during runtime, whereas the latter type is independent of the rendering and depends entirely on the user. Of course, combining multiple masks of any type is possible, too.

For example inside the video encoder, the mask values are used for encoding pixels of higher importance differently than those of lower importance. As H.264/AVC encoding operates on so-called macroblocks (16×16 pixels), which are the elementary units used for motion vector estimation and quantization, the importance mask values need to be resampled to yield one importance value per macroblock. According to this value, any encoder parameters may be influenced that have an effect on bit rate or quality. For instance the search range for motion vectors according to the importance mask can be changed or unimportant macroblocks can be entirely shipped. Importance-based optimization on in the encoder pipeline may be performed where information is actually lost in the so-called quantization step.

Quantization in H.264/AVC happens based on a quantization parameter (QP) that can take exactly 52 integral values, where 0 indicates lossless quantization and 51 indicates maximum compression. Based on the QP, the quantization of transform coefficients within the internal integer transform of H.264/AVC is determined. In this process, a QP value is determined per macroblock, which enables adjusting the quantization separately for each macroblock. The QP range is arranged such that an increase of the QP by 1 results in an increase of the quantization step size by approx. 12%, which in turn results in a reduction of the resulting bit rate for that macroblock by also approx. 12%.

In the VFB the importance mask is used to adjust the QP of the H.264/AVC video encoding per macroblock. The x264 library used offers three modes according to which the internal strategy for choosing the QP is determined: Constant QP (CQP), setting the QP to a fixed value for all macroblocks in the encoding process, Constant Rate Factor (CRF), targeting a constant perceived quality in the output, and Constant Bit Rate (CBR), targeting a constant output bit rate. As the CBR mode varies too much in the output quality, and the CQP mode only allows to set the QP globally without ever changing CRF is chosen. The x264 implementation of the CRF mode pins down the QP at a default medium value of 23, and adapts it according to the internal analysis of the content e.g., in terms of movement or repetitive patterns. FIG. 8 shows the histogram of QP distribution in an example stream using default parameters (in red color).

In the adaptive video encoding, a mapping of the normalized importance parameter available for each pixel is performed—and deduced for each macroblock—to create an integral quantization parameter offset (QPO) in a configurable interval ($QPO_{min}$, $QPO_{max}$). For each macroblock, the QPO is added to the QP that is set automatically, resulting in an altered QP value. The 0.5 mask value is fixed to result in a QPO value of 0 (meaning no changes to the automatically determined QP), and then perform a simple rounded inverse linear mapping of QPO values in (0,0.5] and [0.5,1) onto (0, $QPO_{max}$) and ($QPO_{min}$, 0), respectively.

Finally, the adaptive video encoding may include progressive refinement of the areas not primarily important according to the importance mask. The application sends the VFB an idle signal, which indicates that no new frames have been produced, but the last frame pushed into the VFB should be refined further. Refinement may be performed by progressively fading the importance mask towards a full quality mask, and re-encoding the previous frame with that altered importance. Besides the gradually changing mask, the standard motion vector search within the video encoder helps considerably in the refinement process, because full-quality areas of the previous frame do not have to be re-encoded; they can be just reused using inter-frame referencing.

FIG. 9a-9c show video frame encodings of a method of a eighth, ninth and tenth embodiment of the present invention.

Figure 9:
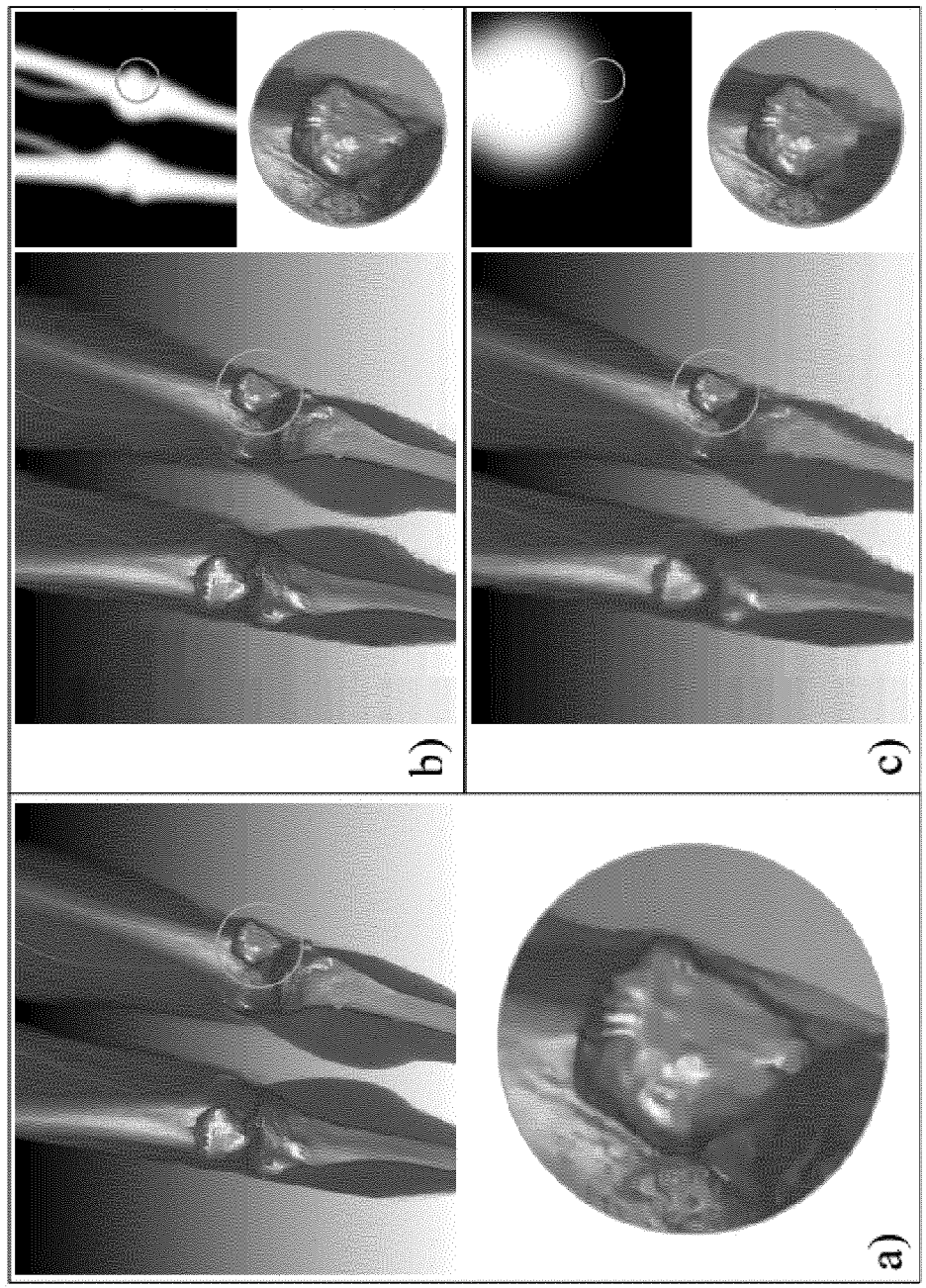
FIG. 9a-9c shows video frame encodings of a method according to an eighth, ninth and tenth embodiment of the present invention.

In FIG. 9 visual examples of masks and encoded images produced by the masks are shown: Video frames extracted from the virtual frame buffer encoding are shown in FIG. 9a using default encoding, in FIG. 9b using adaptive encoding with depicted segmentation masks, and in FIG. 9c using adaptive encoding with a depicted hotspot mask is shown. All frames shown are captured prior to progressive refinement of the areas marked unimportant.

In FIG. 9 an output of a timed sequence of rendered images of a human body data set and matching importance mask images is therefore shown, which afterwards played out the raw image data according to the recorded timestamps and wrote it live to a VFB alongside the matching masks. Inside the VFB, the adaptive video encoding was applied for each incoming image frame and mask.

Figure 10:
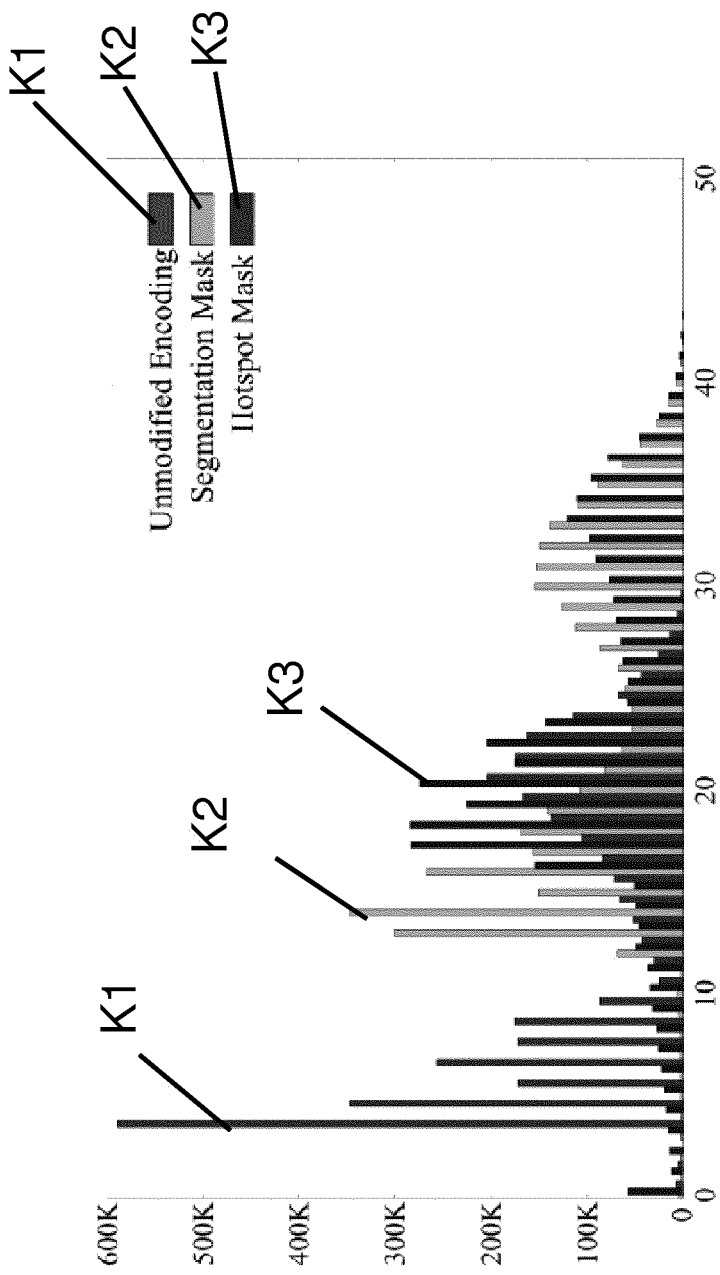
FIG. 10 shows quality parameter histograms of a method according to an eleventh embodiment of the present invention.

As a baseline for comparison, the default encoding as done by the x264 library was used, without any adaptive encoding extensions. FIG. 10 shows the histogram K1 of quality parameters QPs automatically created for all macroblocks are shown. The distribution shows a mean QP of 12.56 with a standard deviation of 7.66. This indicates that the automatic QP assignment in x264 assumes much lower QPs as necessary for the tested sequence than the default value in CRF mode (which is 23). The lower QPs result in less quantization, thus higher quality, but also a comparatively high bit rate, shown in the table 1 below

TABLE 1

Statistics for the tested scenarios: mean QP (standard deviation), mean bit rate in kbit/s.

| SCENARIO | MEAN QP (σ) | MEAN BR |
|---|---|---|
| Unmodified encoding | 12.56 (7.66) | 7861.19 |
| Adaptive (segmentation mask) | 22.44 (8.14) | 3665.06 |
| Adaptive (hotspot mask) | 21.79 (8.43) | 5943.17 |

Two importance masks K2, K3 with the described baseline setting are compared: a segmentation mask K2, which uses object-based segmentation to mark structures within the visualized data set as important features, and a hotspot mask K3, an example of a user-generated mask which simply marks a circular area within the image as most important and applies a linear falloff at the hotspot edges. Visual examples of the masks and encoded images they produce are shown in FIG. 9a-c. For the evaluation of both masks, the QPO range was fixed symmetrically at $(QPO_{min}, QPO_{max})=[-15,15]$, which empirical tests proved to be a good compromise between high quality in important regions and high compression in less important regions.

Using the segmentation mask inside the video encoding of the VFB shifts the mean QP to 22.44 with a standard deviation of 8.14 which is shown in-histogram in FIG. 10 marked with reference sign K2. The mean QP is therefore shifted significantly towards using more quantization, which results in an assumedly lower quality and definitely lower bit rate on average. Still, as the mask segments visualized structures as important for an observer resulting in much lower QPs and better quality in these macroblocks, users perceived the overall quality as higher than in the unmodified baseline encoding. This is due to the significantly higher quantization which was applied to areas carrying less information e.g., depicting background or large uniform structures, which keeps the perceived quality on a high level. Despite this increase in quality, the average bit rate is not increased but actually decreases by over 50%, compared to unmodified encoding, cf. Table 1 above.

Using the hotspot mask to adapt video encoding, the mean QP shifts to 21.79 with a standard deviation of 8.43 (see histogram in FIG. 10 marked with reference sign K3). Those values are comparable to the ones observed for the segmentation mask K2. Nonetheless, the bit rate improvement of the hotspot mask K3 in comparison to the baseline encoding is only 24%. This can be explained by the fact that the region of interest the hotspot mask K3 marks as important not only covers areas that actually need high bit rates to preserve detail, but also, for example, includes parts of the background. Those parts of the image would otherwise undergo a high and efficient quantization, but have their QPs lowered by the importance mask overriding the decision of the video encoder. Therefore masks highlighting important details more exactly like the segmentation mask severely outperform coarser masks that only roughly point out important parts of the image like the hotspot mask K2. Still, both masks K2, K3 perform significantly better than the baseline encoding, marked with reference sign K1.

The rendering system may use abstract quality levels (QL). A QL is defined as a visual representation of a data set, which can be independently generated on either the client(s), the server(s), or both. User-perceived quality increases with the level number. Quality levels may be requested in order when rendering to progressively refine the visualization for the user. The process can be aborted due to interaction or a decision by the rendering system. For example, rendering the highest QL might not be feasible for a distant view. The rendering system is enabled to make such a decision. To render a level, application-specific data such as a level-of-detail (LOD) hierarchy is made available, which is referred to as quality level data (QLD). The classification of a data set in quality levels and the associated data is provided by the underlying rendering system. The rendering server side stores all available QLs for a data set. This includes the highest levels, which a server always supports, but not necessarily every client due to memory and rendering limitations. Also, levels only used by certain client rendering systems are included. For example, a renderer with reduced features may be used on a mobile device, requiring tailored QLD.

In a first step a handshake phase is performed to determine what quality levels of a data set a client connected to a rendering server can locally visualize.

The phase begins with a request to set a data set for the render session and a setting whether hybrid rendering shall be enabled. In closed scenarios, where server capacity and network are known to not be an issue, remote rendering may be adequate. Otherwise, the server may query the underlying rendering system for QL specifications regarding the data set. This may include the size of the level data along with other application-specific information such as required features of the renderer. The specifications are sent to the client, which passes them to the local rendering system. The rendering system examines the input and for each QL determines if enough memory and rendering capability is available for local processing. The client responds to the rendering server with a list of supported levels. At this point, handshaking is complete remote rendering is started.

While remote rendering is ongoing, the data for quality levels which are supported by the client are transferred. This process may be transparent to a user, since the video stream may be interleaved with data chunks whenever possible without disturbing interactivity. Chunk data may be inserted, if user interaction stops, non-interactive levels may be rendered to progressively refine the temporary static view on the client side. Rendering higher QLs can take time, during which the client waits for new image data and the connection is idle. Another option when to insert chunk data is when after all levels for a view have been rendered and put into the video stream, both server and client are idle until the view changes. During these phases data for quality levels may be transmitted where the network is not utilized. The bit rate may be increased over idle time, but does not exceed a maximum to guarantee the transfer can be seamlessly interrupted should the higher-priority video stream become active. Increasing the bit rate and maximum bit rate may be adapted based on the available network bandwidth.

Further resuming after a disconnect or a data set change is enabled. Incomplete transfers are continued should the client reselect the corresponding data set for rendering. Once a QL is available client side, remote rendering is replaced by hybrid rendering.

In the following a scheduling algorithm is described which enables to decide which quality levels need to be rendered and on which side to render.

The input for the algorithm is a list A of all QLs available on server and client, ordered from low to high quality. For each level, a time in milliseconds may be given. This time estimates how long the client has to wait until the level can be displayed after it was requested. For server levels, this includes the network round trip time required to transport the updated video stream to the client. The time value will be set to infinity if no measurement has been computed yet. For now, these timings are assumed to be available.

Every frame, the client copies A to a new list B. In a first step, all infinity entries are removed from B since we can make no assumptions on how to schedule these levels. B is then sorted by time in ascending order. If time matches for two entries, they are ordered by quality. After sorting, entries are removed if a higher quality entry on the same render side exists further up in the list. Then the entry from which traversing B is started may be determined. For this, a minimum frame rate required during phases of interaction is considered, setup as a parameter by a user. The maximum time below or equal the minimum in B is found and all entries before are removed.

The traversal of B outputs a list C, in which all levels due for rendering will be put. The first entry of B will be put in C. Then in B it is moved forward until a higher QL or the end of the list is encountered, removing all entries before. If B is not empty, the time of the entry in A is added corresponding to the most recent entry CE in C to all client entries if CE is to be rendered on the client, otherwise to all server entries. B is sorted by time and quality as described and the process repeats until B is empty.

Once C has been generated, the client requests the levels the server is responsible for and then start local rendering. This parallelizes the rendering process between client and server. This maximizes interactivity and minimizes the time a client has to wait to refine the view with a new quality level.

To update the timings in A, the client considers the time for every complete rendering of a level received. In case of a user interaction, rendering may be aborted at any time, should the underlying render system support this. Since a render session is started with infinity for all levels, every level is initially scheduled. A time entry $T_A$ in A is updated with a new time $T_N$ for every consequent rendering using the convex combination:

$$T_A = T_A \cdot x + T_N \cdot (1-x), x \in [0,1]$$

Using the timings, certain QLs for rendering anymore might not be scheduled. However, the situation might change. A likely scenario is a server, where more clients connect and render performance for each individual session decreases. To account for this, every Nth frame, a QL is automatically scheduled for rendering, possibly bypassing the decision the scheduling algorithm would make. If a bypass occurs, a scheduler may calculate the maximum time allowed for the level to complete. If this time passes, the level would still not be selected in future iterations, and rendering is aborted. N may be defined for each QL independently. automatic scheduling is shifted between levels to avoid congestion scenarios.

In a tiled display wall scenario, a central scheduler may be used for all participating clients to prevent discontinuities across the composite display. First, list A is gathered from each individual client. Then a new list A' is generated containing only entries shared by all A-lists. The maximum timing across A-entries for A' is used and has to wait for the last client to complete the frame before refreshing the display. A' is the input for the central scheduler.

For an implementation of a system according to an embodiment of the invention, so-called Tuvok volume rendering system as the render backend was used. Tuvok provides a hierarchical, bricked renderer, which divides a data set into one or more level-of-details LOD. These LODs can be independently stored and rendered. Also, a trimmed version of Tuvok for mobile devices exists, which currently uses a special, non-hierarchical data set format. The LODs and the mobile format may be directly mapped to the above mentioned method based on quality levels. The lowest quality 1 is assigned to the mobile representation. A desktop client may utilize Tuvok and may support QL 2 or higher. Mobile clients only support level 1 and need to rely on the server for all higher levels. Since the server will never use level 1, it is always rendered on a mobile client in case the server can not provide a higher level in faster time.

In summary of the above it was shown how application-specific information can be used to adaptively tailor a video stream containing rendered pixels. Using the technique, improved image quality for the user in regions of interest while adhering to the available bandwidth is provided. In a tiled display wall scenario, a seamless visualization may be provided using a software-based synchronization with microsecond accuracy. Different quality levels of the visualization to client and server may be distributed for rendering. Utilizing client side resources improves the scalability of our servers and frees network resources for other usage.

Further within the encoder the mode decision may be adapted by limiting the search range of motion vectors based on the mask information even before the quantization is performed on a frame. This way, in important macroblocks at mask borders, the encoder would not search towards the unimportant areas for referencing blocks, but only inwards, because macroblock similarities between encoded areas of low and high importance are typically undesired. The same principle can be applied for consecutive areas of low importance. In addition, the decision to subdivide 16×16 pixel macroblocks into smaller ones (e.g., 4×4 pixels) during encoding can be guided by mask pixels as well. These further options speed up the encoding process and lower the encoded bit rate even further.

Even further the algorithm may be extended to consider small render time differences between quality levels by a threshold to adapt scheduling in certain conditions. For example, if the client receives a lower level just before a higher level arrives, the refinement might be barely visible for the user. Therefore the scheduler might skip the lower level. This reduces the time a client has to wait for higher levels, which are rendered on the same side as the skipped level. Furthermore, the increasing capabilities of mobile devices may be used to support higher quality levels of the rendering backend on those devices.

Figure 11:
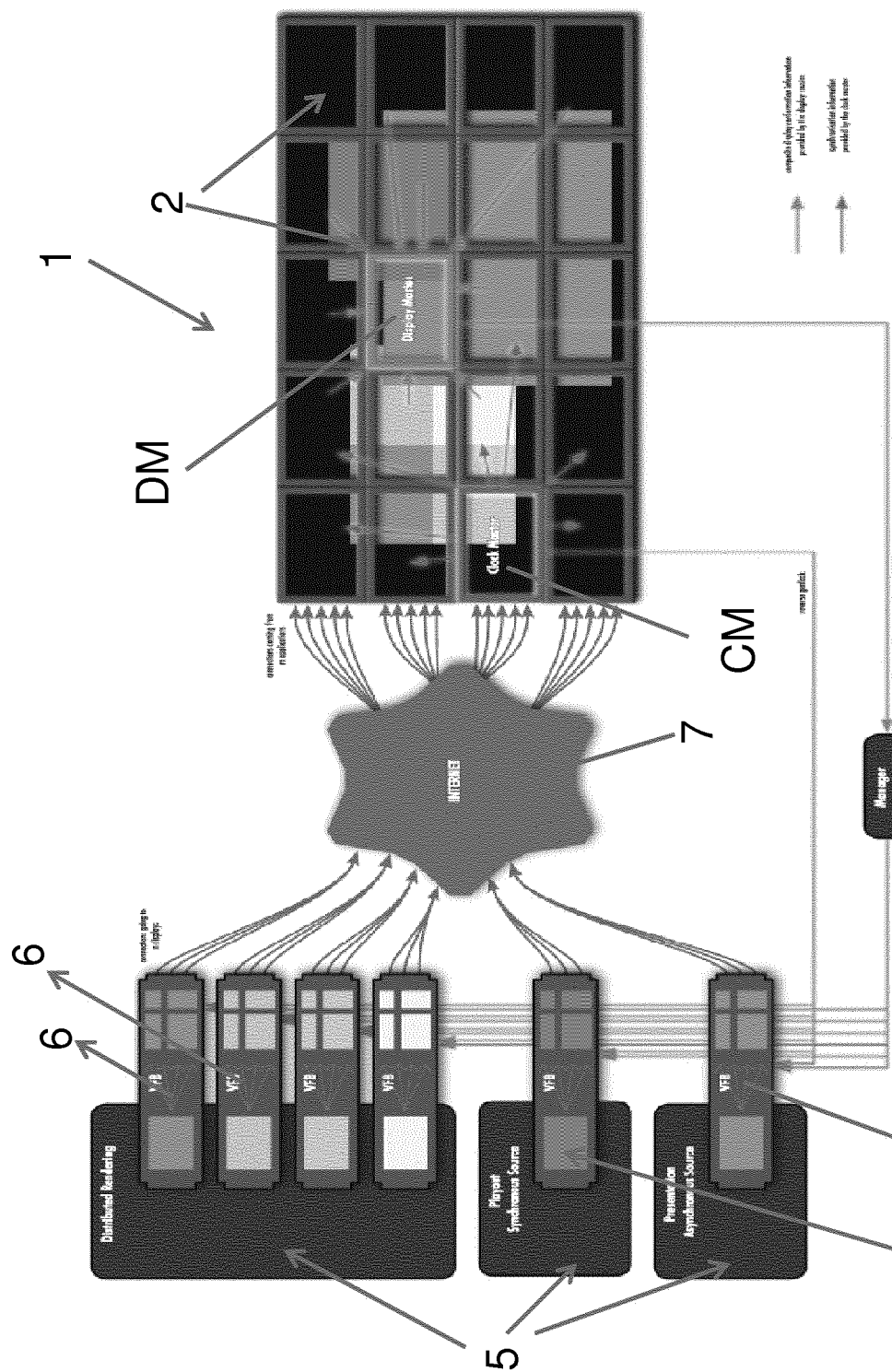
FIG. 11 shows a system according to an twelfth embodiment of the present invention.

FIG. 11 shows a system according to a twelfth embodiment of the present invention.

In FIG. 11 a system comprises a number of pixel sources 5, for example distributed rendering sources, a playout synchronous source and a presentation asynchronous source each having one or more virtual frame buffers 6. The virtual frame buffers 6 are connected via internet 7 to a composite display 1 comprising a plurality of physical display devices 2. One of the displays 2 is defined as clock master display CM transmitting synchronization information to all other displays 2 and to the pixel sources 5 for synchronization. Further one of the display devices 2 is selected as display master DM. The display master DM provides information about the composite display 1 to the network 7 and further to entities connected to the network 7, i.e. for example which other displays besides itself from the composite display 1 what is the overall pixel size of the composite display 1 available to paint on, etc.

In detail in FIG. 11 and preferably in the whole description a display may
be a single physical display device 2, such as an LCD screen or a projector, be the only actual sink for visual content (pixels) in the system, include some processor, which is connected to the network 7 and is able to perform pixel operations on incoming pixel buffers. Furthermore, processing services may be provided to specific network ports by the display itself or by a connected computer, provide information about its capabilities (e.g., pixel size, physical size, 3D location, color depth, refresh rate, stereo capabilities) as a service to the network 7, have a unique identifier, preferably an IP address, which identifies it uniquely in the network 7.

A composite virtual display 1 may comprise of one or more display devices 2, which together form a meta-screen 1 for pixels to be displayed on. An example of such a composite display 1 is a display wall, comprise exactly one display device 2 that acts as the display master DM.

The display master DM of a composite display 1 may be a display, too, provide information about the composite display 1 to the network 7, in particular which other displays 2 besides itself form the composite display 1, what is the overall pixel size of the composite display 1 available to paint on, etc.

An application may be a provider of pixels to be displayed on a composite display 1, i.e., a pixel source. Applications may be the only pixel sources 5 in the overall system, request one or more virtual frame buffers 6 from a display manager M.

Distributed applications may request more than one to spread out the pixel-generating workload to multiple physical hosts.

A virtual frame buffer (VFB) may be a virtual 2D array of pixels for applications to write into, perform color conversion and encoding on pixels that are written to it. If necessary, it scales the pixel array, too, send a video stream it creates from incoming pixels in a peer-to-peer fashion to all hosts that need it. It receives the information, which displays 2 to send the stream to, from the display manager M, be requested in an arbitrary pixel size from the display manager M. The pixels input to the system in any size can be scaled to a size fitting the pixel real estate on the output end in the course of processing by the VFB 6.

The display manager M may be implemented as a separate software component, which may run on any host reachable through the display network 7. This host may be a display device 2, but does not have to be, be the location where all information about composite displays 1 is collected and stored, be the location where all information about pixel sources 5 having requested virtual frame buffers 6 are stored, provide an API enabling the direction of pixel flow from all registered pixel sources 5 to all registered pixel sinks 1, 2, negotiate if and, if yes, where scaling of the video data coming from a specific pixel source 5 is performed. This way, for a magnification of pixels the scaling may take place at the sink 1, 2, whereas for a minification of the pixels, scaling may take place at the pixel source 5 already. This minimizes network traffic in the network 7.

The synchronization architecture is responsible for synchronizing a subset of display devices 2 of a composite display 1 to form a comprehensive stereo display wall. Furthermore, a clock reference for applications to lock onto is generated.

The shown graphics system in FIG. 11 may therefore have a manager M, a central component which is responsible for providing applications with suitable VFBs to write in, and to route streams of pixels written to a VFB somewhere to any display location in the network. This task needs knowledge about all display devices with their physical and compound properties, as well as all applications and their pixel-generating properties.

Furthermore, the manager M is responsible for mapping each input pixel rectangle an application provides to an output pixel rectangle of a display. A display in this respect could again be a compound and comprise multiple physical display devices, so pixels coming from one pixel source may need delivery to multiple pixel sinks, and there might be scaling involved if there is no 1-to-1 mapping of input to output pixel sizes or resolutions.

Finally, after resolving all dependencies (which pixels need to be delivered where), the manager M sets up the end-to-end data flow between a pixel source (e.g. an application, represented by the VFB it is writing to) and potentially many sinks i.e. display devices.

To reduce the network traffic in the graphics system an encoding to pixel streams before sending them over the network may be employed, and decoding them at the display device end. If a constant frame rate is assumed, the pixels rendered by an application are nothing but a video stream, to which all the techniques and compression rates common in video encoding and streaming apply. Significant compression rates can only be achieved with lossy encoding; as always, this includes a tradeoff between quality and compression rate. How to compress also strongly depends on the type of pixels that an application provides: while a video played back wants to send the full pixel set every frame, a presentation might only need to send pixel updates every few minutes whenever the slide changes. Also, the two pixel sets of a stereo source can be encoded very efficiently inside one single stream, making use of frame coherency. The system may therefore incorporate methods to encode all those extremes efficiently.

Major requirement for any codec employed in the real-time virtual graphics system is not so much a high compression ratio but a high-speed encoding and decoding of a video stream, introducing as little latency in the overall processing as possible. The overall tolerable limit for an event roundtrip (time between a user interaction and the visible reaction on a display) was determined to be up to 80-100 ms This holds of course for all other sources of remote pixel generation and might be even much less for applications with high interaction demands.

Besides utility entities like exception classes, a public Application Programming Interface (API) of a Network-Attached Virtual Frame buffer NetVFB can be separated in two parts, which represent the views on the overall system: the application view and the management view.

The application interface is used for implementing pixel sources, and designed to be as simple as possible for making the development of a new pixel source for NetVFB as easy as possible. The application may work with the following entities:

NetVFB::VFB

The VFB entity represents here a single virtual frame buffer, which is requested from the NetVFB system. An application specifies the size in pixels it is about to fill as well as the pixel properties (bit depth and ordering, stereo mode) of the pixels, and receives a VFB object in return.

The detailed implementation of the VFB object is not part of the public interface. Internally, the VFB object holds one or more TransportPipeline objects, which in turn consist of multiple PipelineStage objects. Each pipeline stage represents one step in the processing pipeline on the way of pixel buffers from being delivered by the application to being streamed to the network in order to be displayed on some output device. There may be four groups of stage base classes representing operations that might happen to a buffer in the pipeline: ScaleStage, ColorConversionStage, CompressionStage, and StreamingStage. The scale stage provides scaling the pixel buffer up or down, and other stages may make use of H.264 compression and RTP streaming.

Besides the simple application view on NetVFB there is the management view on the graphics system, which provides an API to control the pixel flow from any attached pixel sources to any attached pixel sinks. The management view operates on the following entities:
NetVFB::ManagerHandle The Manager is here an internal component that connects pixel sources and pixel sinks and establishes the flow between them. The actual manager object is again hidden from the public API; clients can, however, get a handle to the manager running as a service on a host in the network by instantiating a ManagerHandle object configured with the URL of the manager.

The manager handle provides a filtered API for clients to configure the overall NetVFB streaming. Through the handle, it is possible, for instance, to change the output display position and size of any participating stream. Internally, the manager keeps track of connected applications and Internet displays through Application and InternetDisplay objects, which are concrete implementations of the PixelSource and PixelSink interfaces, respectively. Initially, applications are registered once they request a VFB object, the set of Internet displays is built by searching the network for running display services, which provide all the information the manager needs for sending them pixel content.

In the following several example applications are described based on the NetVFB system.

The first application example is the so called colorstream application generating a gradually changing background color with a white horizontal scanline moving over the image with a speed of one pixel per frame. The application uses standard operations on random numbers to generate an RGB color and uses that to fill all pixels except the scanline position, which is colored white using a simple frame/row counter. This application can for example be used to test the encoding of large, colored areas. The single white scanline was added to enable multiple adjacent displays in an embodiment, which all receive parts of the same stream; the scanline then enables comparing the synchronization between neighboring displays of a display wall in that it should appear continuous across physical screen borders. This may be extended by incorporating an (optional or additional) vertical scanline as well, allowing to evaluate vertical display synchronicity, too. The second application is called jpegstream application and loads a given JPEG-compressed image and fills the VFB with the pixels from the decoded raw image. It uses variants of the libjpeg library to perform the actual JPEG decoding. This application may be used to stream pre-rendered, large JPEG images to a consecutive display wall. Pre-rendering a high-resolution image sequence may be used to support multiple synchronized pipelines in a VFB which then can be played back in full display wall resolution.

The third application called noisestream application generates pseudo-random values and displays them as RGB noise pixels across the full frame. Each frame does that from scratch, such that no interdependencies exist between consecutive frames. This application may be used to test a video encoder. Video encoders search for patterns and repetitive structures across neighboring frames in order to save encoding bit rate by referencing previous frames instead of encoding them as a whole. Noise frames provide no such consecutive information and every frame has to be encoded using the full bit rate. Like this, the network load created by each transport pipeline is maximized and network congestion with multiple pipelines may be tested in that way.

The fourth application rtsg2stream application is used to fulfill the task of render of a 3D scene using ray tracing. It makes use of two libraries, the namesake Real-Time Scene Graph (RTSG) in version 2 and the real-time ray tracing framework RTfact. RTSG provides facilities to load scenes in the XML3D format and scene-graph-level access to the loaded scene in the active application. +

The fifth application is called rtpiestream application and uses the RTfact ray tracing library directly (through a binary interface called RTpie, hence the name), without having the scene-graph structure of RTSG on top. Thus, it cannot load advanced scenes from file but operates on scene primitives defined directly inside the application source code. This application may be used for having more fine-grained access and control on the ray tracing functionality than by using it through the scene graph interface. Also depth values in order to use the information within the transport pipeline may be therefore accessed and enable an overall performance increase of rendered scenes through faster encoding. Depth values were used to separate background from foreground pixels, and then take shortcuts in the H.264 encoding workflow could be taken. The search for common features in neighboring frames is one of the most time-consuming operations during encoding, and performance can be decisively improved when using contextual information from the ray tracer to skip some of these search steps.

The sixth application called screengrab application directly uses the native X11 or Win32 APIs (on Linux and Windows, respectively) to capture the content of the current frame buffer and feed it into a VFB. This application enables to display content on a remote receiving client using a standard media player such as VLC. The screengrab application can furthermore be used to achieve scenarios such as streaming presentation slides or arbitrary other content.

To summarize multiple transport pipelines in each VFB enable the streaming of parts of the pixels that are pushed into a VFB by the application to different receivers, such as the actual physical displays of a tiled display wall.

The manager view on the NetVFB system enables to direct the flow from multiple VFBs, potentially having multiple transport pipelines each, to multiple receiver displays. Also at the display end, extensions may be used to enable displays to configure themselves as part of a larger display wall. Both VFBs and displays then have to be enabled to connect to a manager, which may then control them remotely.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for distributing pixel data to physical display devices, the method comprising:
    (a) providing one or more virtual frame-buffers, for temporarily storing the pixel data generated by pixel sources,
    (b) generating one or more virtual displays with display parameters representing one or more of the physical display devices;
    (c) receiving pixel data into the one or more virtual frame buffers from one or more pixel sources,
    (d) processing the pixel data stored in the one or more virtual frame buffers, based on the display parameters; and
    (e) transmitting the processed pixel data from the one or more virtual frame buffers to the virtual displays via a network, based on a network transmission protocol.

2. The method according to claim 1, characterized in that one or more virtual displays announce their characteristic display parameters in the network.

3. The method according to claim 1, characterized in that one or more pixel operations are performed after transmitting the pixel data based on the display parameters.

4. The method according to claim 1, characterized in that the one or more virtual displays are organized tree-like in one or more composite virtual displays with one or more master displays and one or more slave virtual displays, wherein the one or more slave virtual displays form the leaves of the tree-like organization.

5. The method according to claim 4, characterized in that a virtual display master (DM) is selected for holding the one or more composite virtual displays.

6. The method according to claim 1, characterized in that one or more pixel processing pipelines each with one or more processing elements for performing operations on the pixel data are generated.

7. The method according to claim 1, characterized in that the pixel data to be transmitted is encoded or compressed.

8. The method according to claim 1, characterized in that the pixel data is color converted or scaled.

9. The method according to claim 1, characterized in that when a pixel operation reduces the amount of pixel data to be transmitted, the processing of the pixel operation is performed on the pixel data, by the one or more virtual frame buffers or when a pixel operation increases the amount of pixel data to be transmitted the processing of the pixel operation is performed on the transmitted pixel data by the virtual display.

10. The method according to claim 1, characterized in that an outside access interface of the virtual frame buffer to the network is provided for one of the following:
    pixel managing applications,
    gathering announced pixel storage and display device information,
    directing available pixel storage content onto available display devices, or
    updating pixel storage and display device properties where available.

11. The method according to claim 1 characterized in that synchronization information is included at the virtual frame buffer for synchronizing the displaying of pixels at the individual display devices.

12. The method according to claim 1, characterized in that step (e) is performed via a wireless or cable based network.

13. The method according to claim 1, characterized in that a plurality of channels are created within the virtual frame buffer and are transmitted to the one or more virtual displays for presentation.

14. The method according to claim 1, characterized in that the pixel data are adapted globally or locally.

15. The method according to claim 14, characterized in that for global adaption encoding parameters of the pixel data are adapted towards low latency or by choosing an upper bit rate limit.

16. The method according to claim 14, characterized in that for local adaption different importance values are assigned to the pixel data, wherein the importance values are used to indicate an importance of individual pixels.

17. The method according to claim 16, characterized in that defined blocks of the pixel data are adapted according to importance values by adding a correction value.

18. The method according to claim 1, characterized in that before displaying the pixels, the pixel data of these pixels is adapted based on quality level data.

19. The method according to claim 1, characterized in that a generation of pixel data provided by the pixel sources is divided between the pixel sources and the display devices.

20. A system for distributing pixel data to physical display devices, comprising
    (a) one or more virtual frame buffers, for temporarily storing the pixel data generated by pixel sources,
    (b) a generator for generating one or more virtual displays with display parameters representing one or more of the physical display devices;
    (c) a processor for processing the pixel data stored in the one or more virtual frame buffers, based on display parameters characterizing the display devices; and
    (d) a network for transmitting the processed pixel data from the one or more virtual frame buffers to the one or more virtual displays attached to the virtual frame buffers based on a network transmission protocol.

* * * * *